United States Patent
Hirosawa

(10) Patent No.: US 10,007,155 B2
(45) Date of Patent: Jun. 26, 2018

(54) DISPLAY DEVICE HAVING A PIXEL STRUCTURE TO WHICH A LATERAL ELECTRIC FIELD MODE IS APPLIED

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/360,249

(22) Filed: Nov. 23, 2016

(65) Prior Publication Data

US 2017/0146869 A1 May 25, 2017

(30) Foreign Application Priority Data

Nov. 25, 2015 (JP) ................................. 2015-229876

(51) Int. Cl.
| | |
|---|---|
| H01L 27/14 | (2006.01) |
| G02F 1/1343 | (2006.01) |
| G02F 1/1335 | (2006.01) |
| G02F 1/1339 | (2006.01) |
| G02F 1/1362 | (2006.01) |
| G02F 1/1368 | (2006.01) |

(52) U.S. Cl.
CPC ...... *G02F 1/134336* (2013.01); *G02F 1/1368* (2013.01); *G02F 1/13394* (2013.01); *G02F 1/133512* (2013.01); *G02F 1/134363* (2013.01); *G02F 1/136227* (2013.01); *G02F 1/136277* (2013.01); *G02F 1/136286* (2013.01); *G02F 2201/123* (2013.01)

(58) Field of Classification Search
CPC ........... G02F 1/134336; G02F 1/13394; G02F 1/136277; G02F 1/136227; G02F 1/136286; G02F 1/1368; G02F 1/134363; G02F 1/133512; G02F 2201/123
USPC .......................................................... 257/72
See application file for complete search history.

(56) References Cited

U.S. PATENT DOCUMENTS

2013/0003008 A1* 1/2013 Okumoto .......... G02F 1/133514
349/155
2014/0362323 A1* 12/2014 Nakano ............. G02F 1/136213
349/46

(Continued)

FOREIGN PATENT DOCUMENTS

| JP | 2015-14670 | 1/2015 |
|---|---|---|
| JP | 2015-79207 | 4/2015 |

(Continued)

*Primary Examiner* — Anthony Ho
*Assistant Examiner* — Mohammad M Hoque
(74) *Attorney, Agent, or Firm* — Oblon, McClelland, Maier & Neustadt, L.L.P.

(57) ABSTRACT

According to one embodiment, an array substrate comprises source lines arranged in a first direction, gate lines arranged in second direction, pixels, first and second switching elements, a first pixel includes a first pixel electrode connected to the first switching element via a first contact hole formed on one side of a first gate line, and a second pixel includes a second pixel electrode connected to the second switching element via a second contact hole formed on the other side of the first gate line. A counter-substrate comprises a first light-shielding portion opposed to the first gate line and the first contact hole, and a second light-shielding portion opposed to the first gate line and the second contact hole. A spacer is present between substrates.

20 Claims, 19 Drawing Sheets

(56) References Cited

U.S. PATENT DOCUMENTS

| | | |
|---|---|---|
| 2015/0009462 A1 | 1/2015 | Kozuka et al. |
| 2015/0109565 A1 | 4/2015 | Takeda et al. |
| 2015/0138054 A1 | 5/2015 | Nakamura et al. |
| 2015/0162357 A1* | 6/2015 | Miyanaga ........... H01L 27/1222 |
| | | 257/72 |
| 2015/0346572 A1 | 12/2015 | Hirosawa |

FOREIGN PATENT DOCUMENTS

| | | |
|---|---|---|
| JP | 2015-99296 | 5/2015 |
| JP | 2015-155053 | 8/2015 |
| JP | 2015-225300 | 12/2015 |

* cited by examiner

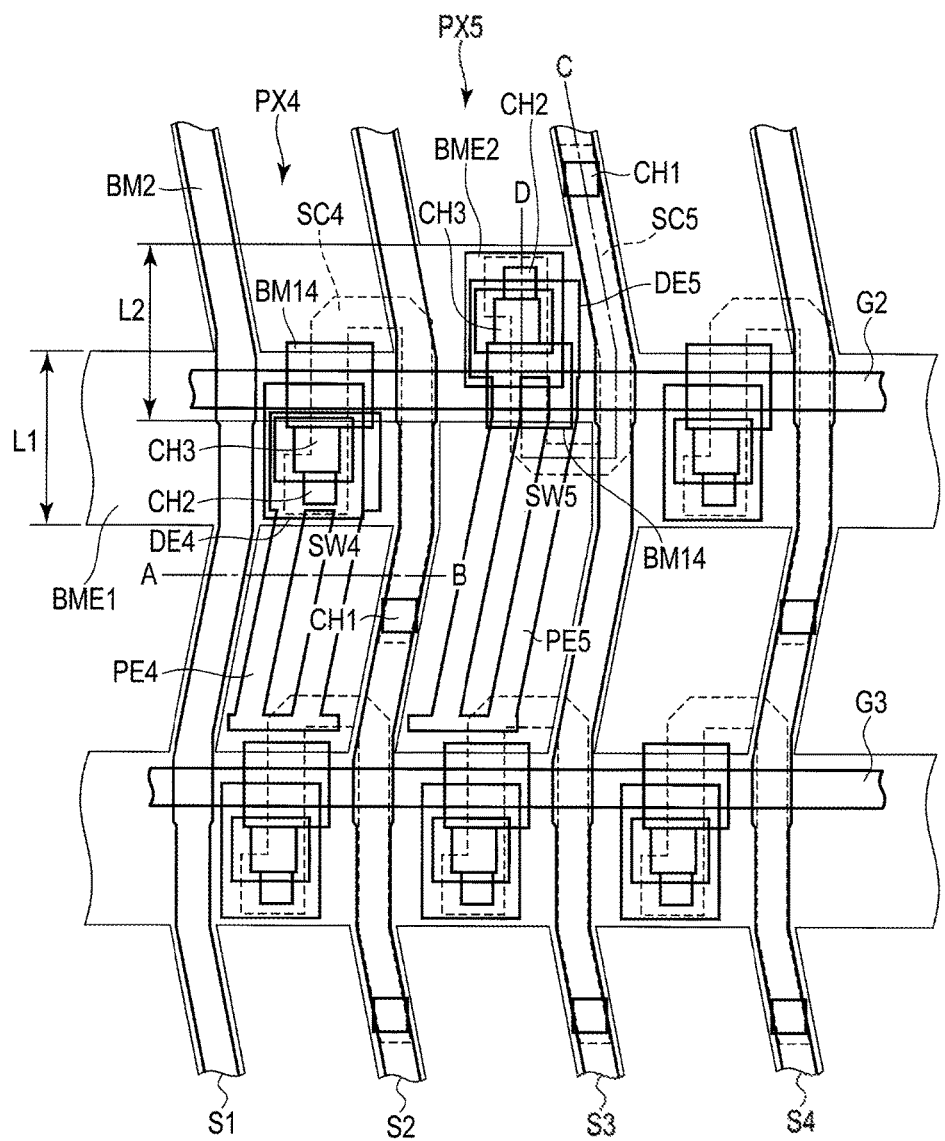
F I G. 4

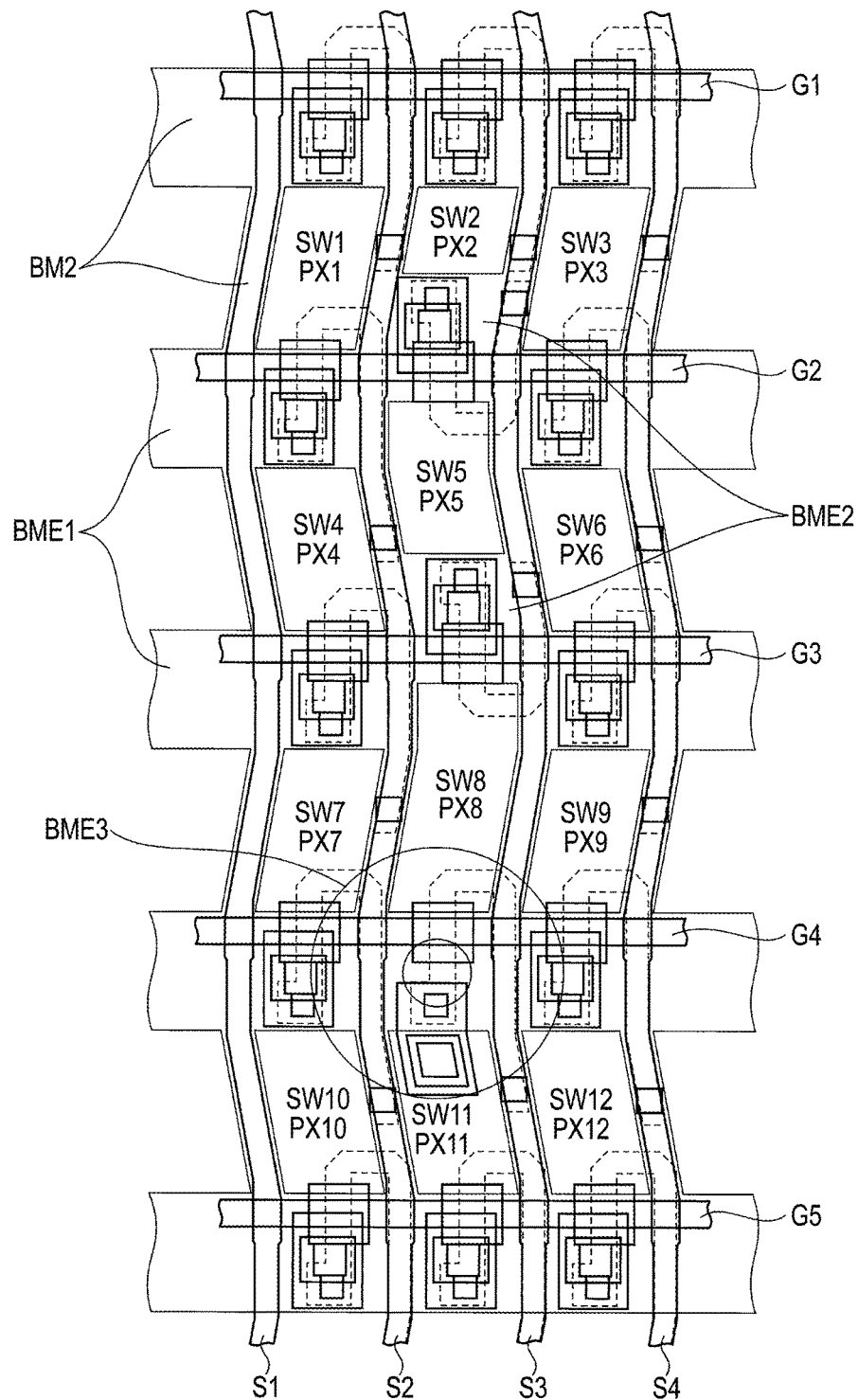
F I G. 10

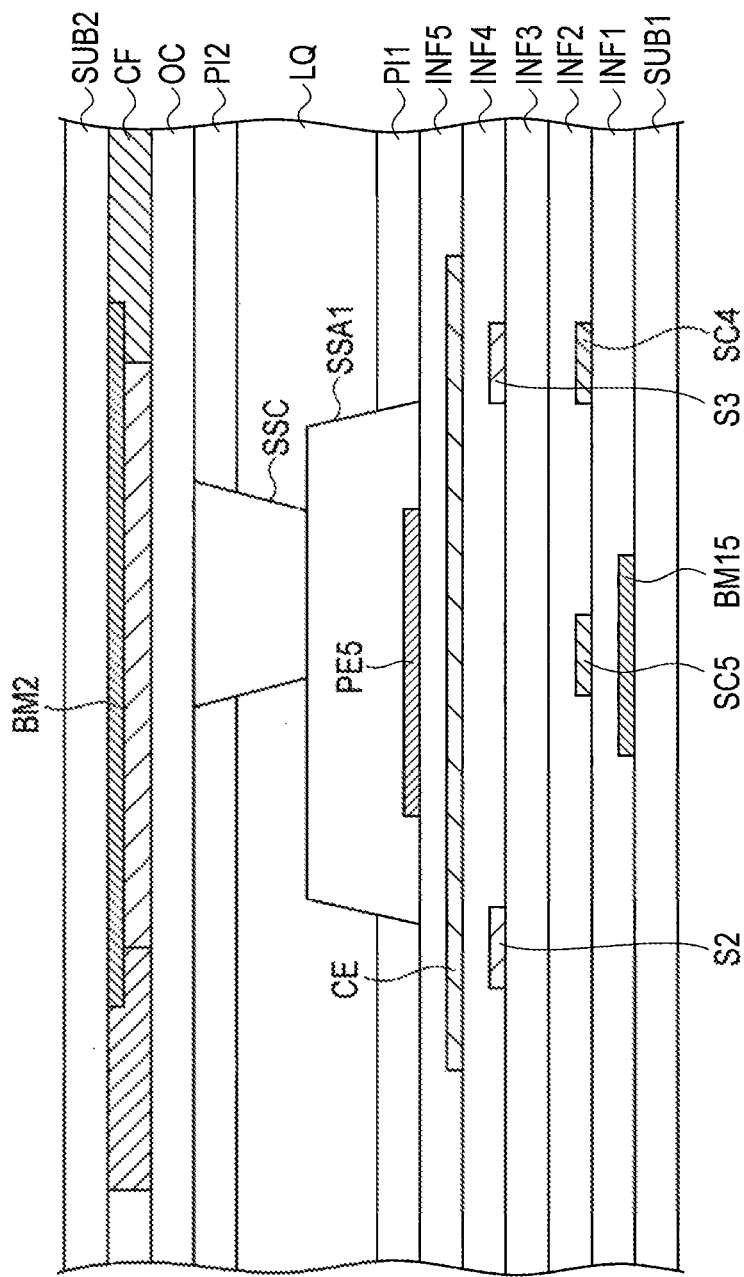
F I G. 15

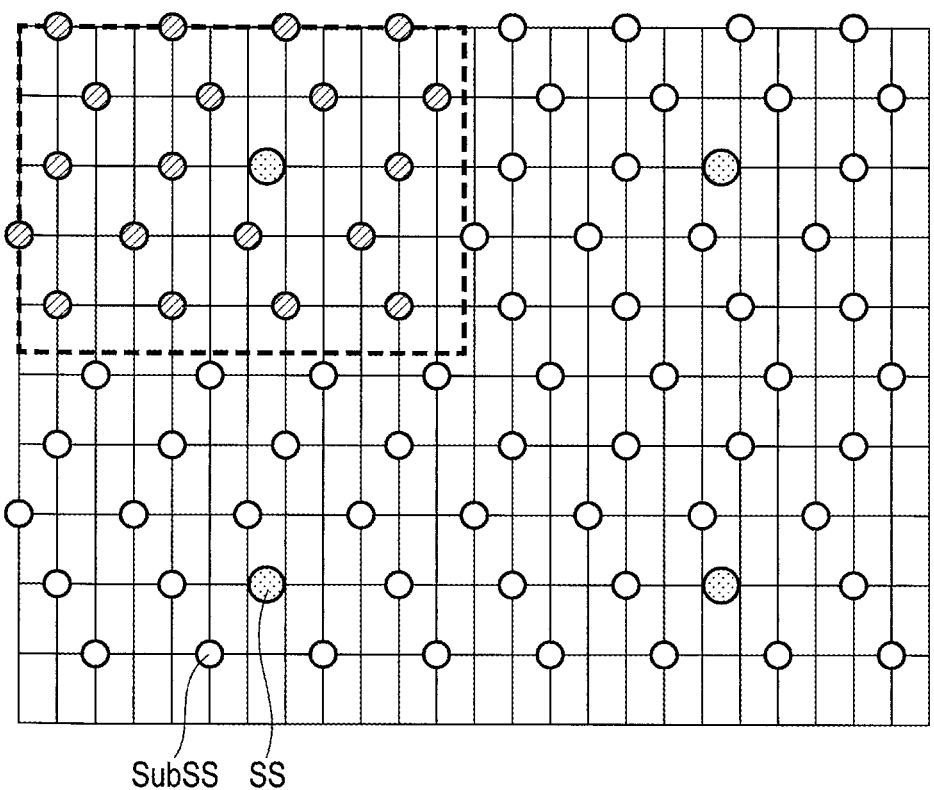
SubSS  SS
F I G. 16

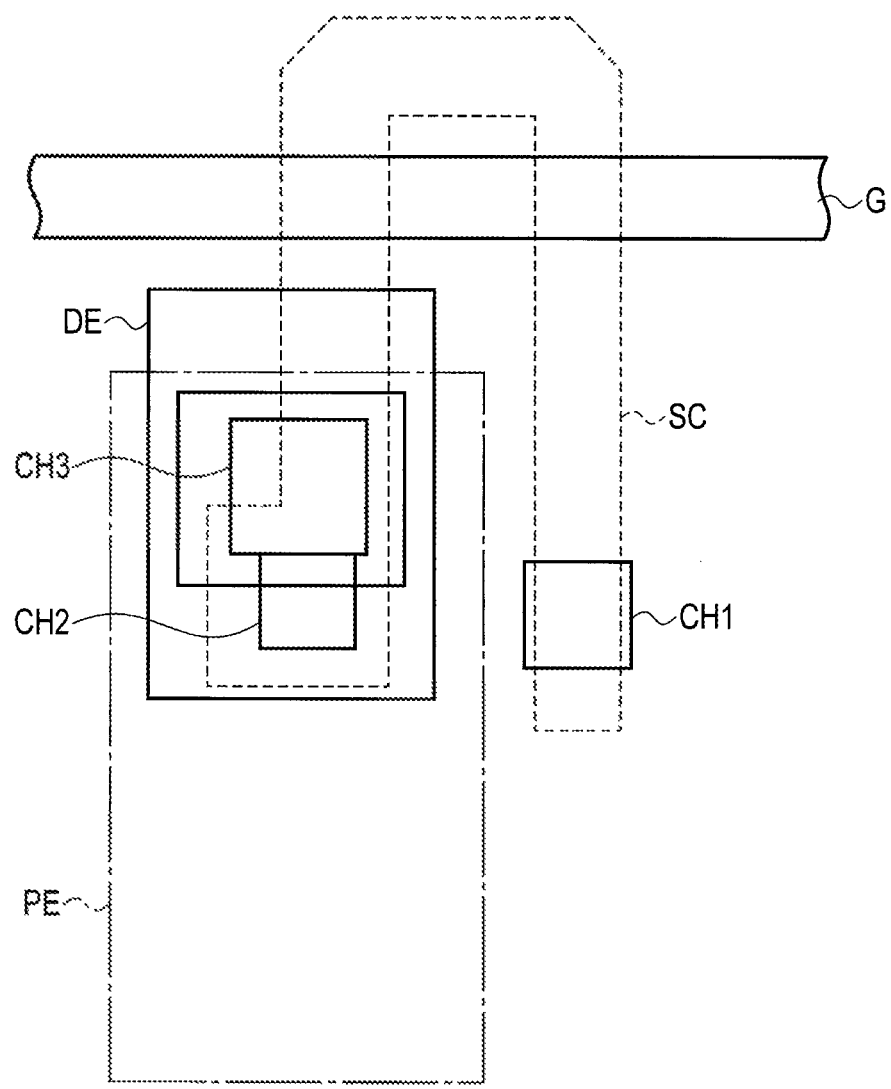
F I G. 17

DISPLAY DEVICE HAVING A PIXEL STRUCTURE TO WHICH A LATERAL ELECTRIC FIELD MODE IS APPLIED

CROSS-REFERENCE TO RELATED APPLICATIONS

This application is based upon and claims the benefit of priority from Japanese Patent Application No. 2015-229876, filed Nov. 25, 2015, the entire contents of which are incorporated herein by reference.

FIELD

Embodiments described herein relate generally to a liquid crystal display device.

BACKGROUND

Recently, technology of providing pixels of different colors with different pixel areas by changing intervals between adjacent source lines in a liquid crystal display device of a lateral electric field mode is known.

BRIEF DESCRIPTION OF THE DRAWINGS

FIG. 4 is an enlarged view of pixels PX4 and PX5 of the first embodiment.

FIG. 10 is a schematic view of a first modified example of the second embodiment in which pixels in the array substrate AR overlap the light-shielding layer and the spacer formed on the counter-substrate CT side.

FIG. 15 is a cross-sectional view along K-L of FIG. 14.

FIG. 16 is a schematic view of distribution of the spacers of the second embodiment.

FIG. 17 is an illustration of a first pixel pattern of the embodiments.

DETAILED DESCRIPTION

Figure 1:
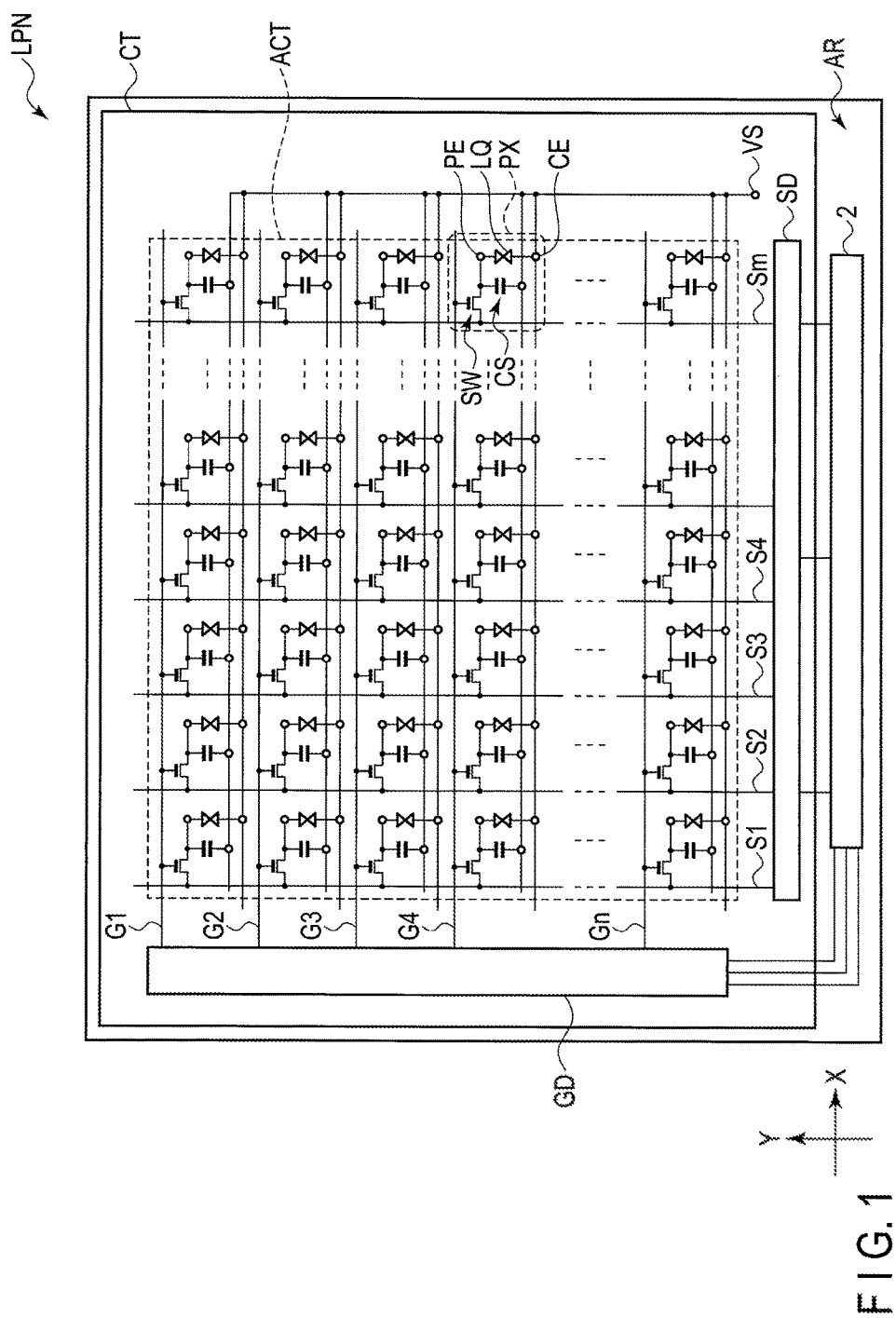
FIG. 1 is a schematic view of a structure and an equivalent circuit of a liquid crystal display device of embodiments.

The embodiments aim to provide a display device capable of preventing reduction of aperture areas and improving display quality, in particular in a pixel structure for implementing a high-definition product.

In general, according to one embodiment, a display device comprises a first substrate and second substrate.

The first substrate includes source lines arranged in a first direction, gate lines arranged in a second direction, a first switching element and a second switching element connected to a first gate line which is one of the gate lines, a first pixel electrode which is electrically connected to the first switching element via a first contact hole formed on one side of the first gate line in the second direction and extends toward the one side in the second direction, and a second pixel electrode which is electrically connected to the second switching element via a second contact hole formed on other side of the first gate line in the second direction and extends toward the one side in the second direction beyond the first gate line. And the second substrate opposed to the first substrate.

In the drawings, constituent elements having like or similar functions are denoted by the same reference numbers and their duplicated explanation is omitted.

FIG. 1 is a schematic view of a structure and an equivalent circuit of a liquid crystal display panel LPN that constitutes a liquid crystal display device of the embodiments.

The liquid crystal display device comprises an active matrix liquid crystal display panel LPN. The liquid crystal display panel LPN comprises an array substrate AR which is a first substrate, a counter-substrate CT which is a second substrate opposed to the array substrate AR, and a liquid crystal layer LQ held between the array substrate AR and the counter-substrate CT. The liquid crystal display panel LPN comprises an active area ACT in which an image is displayed. The active area ACT corresponds to an area that contributes to image display in an area where the liquid crystal layer LQ is held between the array substrate AR and the counter-substrate ACT. For example, the active area ACT is a rectangular area composed of pixels PX arrayed in a matrix.

In the active matrix liquid crystal display panel LPN, the array substrate AR includes gate lines G (G1 to Gn), source lines S (S1 to Sm), switching elements SW, pixel electrodes PE, a common electrode CE and the like. The gate lines G (G1 to Gn) extend substantially in a first direction X and are arranged in a second direction Y crossing the first direction X. The source lines S (S1 to Sm) extend substantially in the second direction Y and are arranged in the first direction X. The gate lines G and the source lines S may be curved according to a layout of pixels or a shape of pixel electrodes as described later. The switching element SW is electrically connected to the gate line G and the source line S in each pixel PX. The pixel electrode PE is electrically connected to the pixel switching element SW in each pixel PX. The common electrode CE is formed commonly across the pixels PX and opposed to each pixel electrode PE in the active area ACT. For example, a storage capacitor CS is formed between the common electrode CE and the pixel electrode PE.

Each gate line G is led out to the outside of the active area ACT and connected to a first drive circuit GD. Each source line S is led out to the outside of the active area ACT and connected to a second drive circuit SD. For example, at least part of the first drive circuit GD and the second drive circuit SD is formed on the array substrate AR and connected to a drive IC chip 2. The drive IC chip 2 is equipped with a controller which controls the first drive circuit GD and the second drive circuit SD, and serves as a signal supply source for supplying signals necessary for driving the liquid crystal display panel LPN. In the example illustrated, the drive IC chip 2 is mounted on the array substrate AR outside the active area ACT. The common electrode CE is led out to the outside of the active area ACT and connected to a power supply module VS. The power supply module VS supplies a common potential to the common electrode CE.

A first embodiment is described with reference to FIG. 1 to FIG. 6. A pixel structure to which a lateral electric field mode is applied is explained as an example, and main portions necessary for the explanation alone are illustrated in the drawings.

Figure 2:
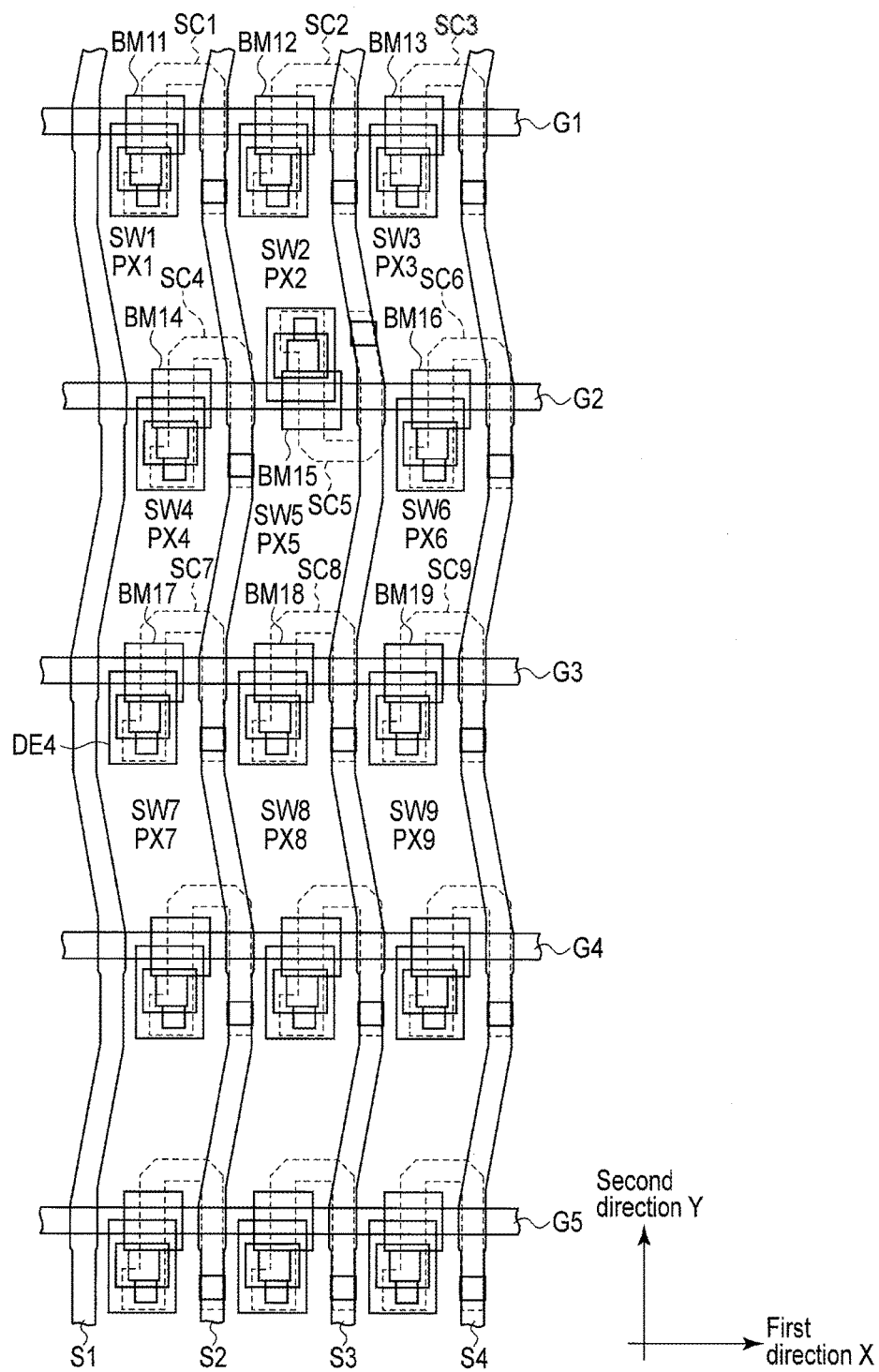
FIG. 2 is a schematic view of pixels in an array substrate AR of a first embodiment from the counter-substrate side.

FIG. 2 is a schematic view of pixels in the array substrate AR of the first embodiment from the counter-substrate side. In FIG. 2, the array substrate AR comprises first light-shielding layer BM1 (BM11 to BM19), semiconductor layers SC (SC1 to SC9), gate lines G (G1 to G5), source lines S (S1 to S4), switching elements SW (SW1 to SW9) and pixels PX (PX1 to PX9).

FIG. 2 mainly shows the switching element structure without showing the pixel electrodes for simplicity. As described later, the pixel electrodes extend toward the same side in the second direction in respective pixels PX1 to PX9.

The gate lines G1 to G5 extend in the first direction X and are arranged in the second direction Y crossing the first direction X at substantially regular intervals. The source lines S1 to S4 extend in the second direction Y and are arranged in the first direction X at substantially regular intervals. The substantially regular intervals may include an interval multiplied by 0.8 to 1.2, preferably 0.9 to 1.1, considering production errors. In the example illustrated, each source line S is constituted by straight portions at intersections with the gate lines G and oblique portions between the gate lines G, and extends in the second direction. However, each source line S may be constituted only by a straight portion extending in the second direction Y. The gate lines G and the source lines S are metal lines formed of a metal material such as molybdenum or aluminum. The metal material of the gate lines G and the source lines S may form a laminated structure with other metal materials.

A pixel PX1 is an area defined by the gate lines G1 and G2 and the source lines S1 and S2. Similarly, pixels PX2 and PX3 are areas defined by the gate lines G1 and G2 and the source lines S2 to S4 and are arranged next to the pixel PX1 in the first direction. Pixels PX4 to PX6 are areas defined by the gate lines G2 and G3 and the source lines S1 to S4 and are arranged next to the pixels PX1 to PX3 in the second direction. Pixels PX7 to PX9 are areas defined by the gate lines G3 and G4 and the source lines S1 to S4 and are arranged next to the pixels PX4 to PX6 in the second direction. A switching element SW1 is a switching element of the pixel PX1. Similarly, switching elements SW2 to SW9 are switching elements of pixels PX2 to PX9, respectively. The source lines S1 to S4 are arranged in the first direction X at substantially regular intervals, and thus the pixels PX1 to PX9 are substantially equal in the width in the first direction. The gate lines G1 to G5 are arranged in the second direction at substantially regular intervals, and thus the pixels PX1 to PX9 are substantially equal in the width in the second direction. In the present embodiment, the width between the gate lines G is greater than that between the source lines S, and thus each pixel has a rectangle shape elongated in the second direction. For example, the width between the gate lines G is 30 µm and the width between the source lines S is 15 µm such that each pixel has an aspect ratio of 2:1. However, the aspect ratio is merely an example and each pixel may also have an aspect ratio of, for example, 3:1.

Figure 5:
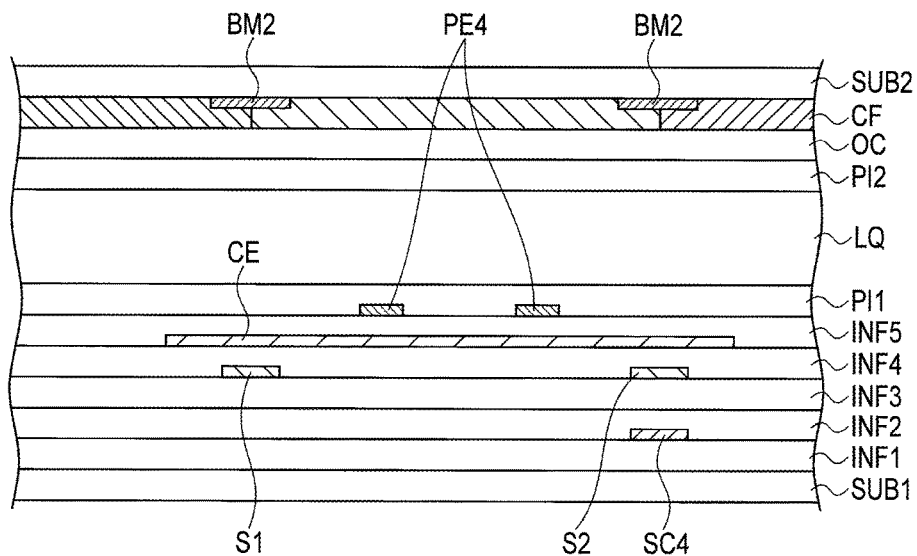
FIG. 5 is a cross-sectional view along A-B of FIG. 4.
Figure 6:
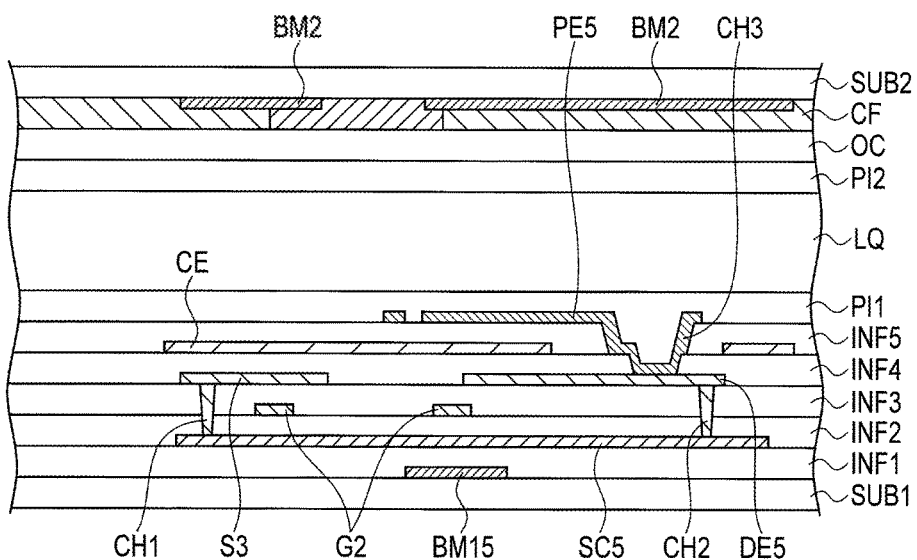
FIG. 6 is a cross-sectional view along C-D of FIG. 4.

A brief description of the switching elements SW and the layered structure of the array substrate AR is provided below with reference to FIG. 4 to FIG. 6. FIG. 4 is an enlarged view of the pixels PX4 and PX5. FIG. 5 is a cross-sectional view along A-B of FIG. 4. FIG. 6 is a cross-sectional view along C-D of FIG. 4.

The layered structure of the array substrate AR is described with reference to FIG. 5 and FIG. 6. In the description of the array substrate AR, the liquid crystal layer LQ side is defined as the upper side and a first insulating substrate SUB1 side is defined as the lower side. The array substrate AR comprises a first insulating substrate SUB1. For example, the first insulating substrate SUB1 is a glass or plastic substrate. First light-shielding layers BM1 (BM15) (see C-D of FIG. 4 and FIG. 6) are provided on the first insulating substrate SUB1. For example, the first light-shielding layers BM1 are formed of a black resin material or a light-shielding metal material. A first insulating film INF1 covers the first light-shielding layers BM1 and the first insulating substrate SUB1 and is formed of, for example, an inorganic material such as a silicon oxide film or a silicon nitride film. The semiconductor layers SC (SC4 and SC5) are formed on the first insulating film INF1 and a second insulating film INF2 which covers the first insulating film INF1 and the semiconductor layers SC is formed. The semiconductor layers SC are formed of, for example, polycrystalline silicon (p-Si), but may be formed of amorphous silicon (a-Si), an oxide semiconductor or the like. For example, the second insulating film INF2 is formed of an inorganic material such as silicon oxide. The gate lines G (G2 in FIG. 6) are disposed on the second insulating film INF2, and a third insulating film INF3 which covers the gate lines G and the second insulating substrate INF2 is formed. For example, the third insulating film INF3 is formed of an inorganic material such as silicon oxide or silicon nitride. The source lines S (S1 and S3 in FIG. 5 and FIG. 6) and relay electrodes DE (DE5 in FIG. 6) are formed on the third insulating film INF3, and a fourth insulating film INF4 which covers the source lines S, the relay electrodes DE and the third insulating film INF3 is formed. For example, the fourth insulating film INF4 is formed of an organic material. A common electrode CE is formed on the fourth insulating film INF4, and a fifth insulating film INF5 which covers the common electrode CE and the fourth insulating film INF4 is formed. For example, the common electrode CE is formed of a transparent conductive material such as indium tin oxide (ITO) or indium zinc oxide (IZO). For example, the fifth insulating film INF5 is formed of an inorganic material such as a silicon oxide film or a silicon nitride film. The pixel electrodes PE (PE4 and PE5 in FIG. 4, FIG. 5 and FIG. 6) are formed on the fifth insulating film INF5, and a first alignment film PI1 which covers the pixel electrodes PE is formed. For example, the pixel electrodes PE are formed of a transparent conductive material such as indium tin oxide (ITO) or indium zinc oxide (IZO). For example, the first alignment film PI1 is formed of an organic material such as polyimide. Each of the first to fifth insulating films INF1 to INF5 is not necessarily a single layer and may have a laminated structure of two layers.

The layered structure of the counter-substrate CT is described with reference to FIG. 5 and FIG. 6. In the description of the counter-substrate CT, the liquid crystal layer LQ side is defined as the upper side and a second insulating substrate SUB2 side is defined as the lower side. The counter-substrate CT comprises a second insulating substrate SUB2. For example, the second insulating substrate SUB2 is a glass or plastic substrate. A second light-shielding layer BM2 is formed on the second insulating substrate SUB2, and color filters CF which cover the second light-shielding layer BM2 and the second insulating substrate SUB2 are formed. For example, the second light-shielding layer BM2 is formed of a black resin material or a light-shielding metal material. The color filters CF are formed of resin materials colored red, blue, green, white or the like. In the case of a white filter CF, the filter may be colorless or pale-colored (for example, pale yellow or pale blue), or the filter corresponding to white itself may be omitted. An overcoat layer OC which covers the color filters CF is formed and then a second alignment film PI2 which covers the overcoat layer OC is stacked thereon. Instead of the above-described order of the second insulating substrate SUB2, the second light-shielding layer BM2 and the color filters CF, for example, the second insulating substrate SUB2, the color filters CF, the second light-shielding layer BM2, the overcoat layer OC and the second alignment film PI2 may be stacked in this order. Alternatively, these layers may be stacked in the order of the second insulating substrate SUB2, the color filters CF, the overcoat layer OC, the second light-shielding layer BM2 and the second alignment film PI2.

As shown in FIG. 5 and FIG. 6, the liquid crystal layer LQ is held between the first alignment film PI1 and the second alignment film PI2. Spacers for adjusting cell gap of the liquid crystal layer LQ, which are not shown in FIG. 2 to FIG. 6 but will be described with reference to FIG. 7 and the subsequent drawings, are formed on the counter-substrate CT and/or the array substrate AR.

The switching elements SW and the first light-shielding layers BM1 of the first embodiment are described with reference to FIG. 2, FIG. 4 and FIG. 6. FIG. 4 is an enlarged view of the pixels PX4 and PX5 of FIG. 2. The semiconductor layer SC4 of the switching element SW4 formed in the pixel PX4 is connected to the source line S2 via a contact hole CH1 formed between the gate lines G2 and G3, and disposed below the source line S2. The semiconductor layer SC4 is, for example, U- or J-shaped, extends along the source line S2 toward the gate line G2, is bent toward the source line S1 at a point beyond the gate line G2, extends in the first direction, is bent toward the gate line G3 roughly at the center of the gate line G2 which constitutes the short side of the pixel PX4, and extends in the second direction across the gate line G2. A first light-shielding layer BM14 is formed at the intersection of the gate line G2 and the semiconductor layer SC4 in the pixel PX4. In the present embodiment, the first light-shielding layer BM14 is formed like an island between the source lines S1 and S2. The semiconductor layer is also present in an area where the gate line G2 and the source line S2 intersect each other, but the first light-shielding layer BM1 is not formed below the semiconductor layer SC4 in this area. However, the first light-shielding layer BM1 may be formed in the area in which the source line S2, the gate line G2 and the semiconductor layer SC4 intersect each other. The semiconductor layer SC4 is connected to a relay electrode DE4 via a contact hole CH2 in the pixel PX4. The relay electrode DE4 extends from the contact hole CH2 toward the gate line G2, and is connected to the pixel electrode PE4 via a contact hole CH3 between the contact hole CH2 and the gate line G2. The pixel electrode PE4 extends from the contact hole CH3 toward the gate line G3. The switching element SW4 is a double gate switching element comprising the semiconductor layer SC4, a source electrode integral with the source line S2 connected to a source region of the semiconductor layer SC4, two gate electrodes integral with the gate line G2 opposed to a channel region of the semiconductor layer SC4, and the relay electrode DE4 connected to a drain region of the semiconductor layer SC4.

A switching element SW5 in the pixel PX5 has a shape symmetrical to the switching element SW4 with respect to the gate line G2. A contact hole CH1 for connecting the semiconductor layer SC to the source line S and a contact hole CH3 for connecting the pixel electrode PE to the relay electrode DE are formed on the gate line G1 side. A contact hole CH2 for connecting the semiconductor layer SC to the relay electrode DE is also formed between the gate line G2 and the contact hole CH3.

The switching elements SW including the semiconductor layers SC are not necessarily axisymmetrical in the pixels PX4 and PX5 provided that the contact holes CH1 are formed on the opposite sides of the gate line G.

The switching elements SW1 to SW3 and SW6 to SW9 of the respective pixels PX1 to PX3 and PX6 to PX9 basically have the same structure as the switching element SW4 except the direction of tilt of the source lines S. That is, the contact holes CH3 of the switching elements SW4 and SW6 are formed substantially in the same straight line in the first direction, but the contact hole CH3 of the switching element SW5 is located on the opposite side of the gate line G2. The contact holes CH3 of the switching elements SW1 to SW3 are located substantially in the same straight line in the first direction, and the contact holes CH3 of the switching elements SW7 to SW9 are located substantially in the same straight line in the first direction.

The contact holes CH3 of the switching elements SW1 to SW4 and SW6 to SW9 are formed in the pixels PX1 to PX4 and PX6 to SW9, respectively. In contrast, the contact hole CH3 of the switching element SW5 of the pixel PX5 is formed in the pixel PX2.

As shown in FIG. 6, the contact hole CH1 is a contact hole for the source line S and the semiconductor layer SC, and is formed in the second insulating film INF2 and the third insulating film INF3. The contact hole CH2 is a contact hole for the semiconductor layer SC and the relay electrode DE, and is formed in the second insulating film INF2 and the third insulating film INF3. The contact hole CH3 is a contact hole for the relay electrode DE and the pixel electrode PE, and is formed in the fourth insulating film ING4 and the fifth insulating film ING5.

The pixel electrodes PE are omitted in FIG. 2, but are shown in FIG. 4 (PE4 and PE5). The pixel electrode PE4 of the pixel PX4 comprises a contact portion with the relay electrode DE in the contact hole CH3 formed in the pixel PX4, two main pixel electrodes extending substantially parallel to the source line S, and sub-pixel electrodes connecting the ends of the two main pixel electrodes. The pixel electrode PE5 of the pixel PX5 comprises a contact portion with the relay electrode DE6 in the contact hole CH3 of the switching element SW5 formed in the pixel PX2, two main pixel electrodes extending substantially parallel to the source line S in the pixel PX5 beyond the gate line G2, and sub-pixel electrodes connecting the ends of the two main pixel electrodes. In the present embodiment, the pixel electrode PE5 is longer than the pixel electrode PE4 in the second direction.

Since the switching element SW5 of the pixel PX5 is formed in the pixel PX2 as shown in FIG. 2, an area of the pixel PX2 in which the pixel electrode PE2 is formed is less than those of the other pixels. Accordingly, the pixel electrode PE2 of the pixel PX2 is shorter than the other pixel electrodes.

The shape of the second light-shielding layer BM2 is hereinafter described with reference to FIG. 2 to FIG. 6 with the second light-shielding layer BM2 of the counter-substrate CT overlapping the array substrate AR of the first embodiment. The second light-shielding layer BM2 has a shape opposed to the gate lines G and the source lines S, and comprises extension portions (this may be called light-shielding portions) BME1 (FIG. 3) extending in the second direction so as to cover the contact holes CH3 formed near the gate lines G in the area opposed to the gate lines G. In the pixels PX1, PX2 and PX3, the contact holes CH3 of the respective switching elements SW1, SW2 and SW3 are formed substantially in the same straight line in the first direction, and the extension portions BME1 of the second light-shielding layer BM2 extend from the gate line G1 toward the gate line G2 and are opposed to the contact holes CH3 of the respective pixels PX1, PX2 and PX3. In the gate line G1 area, the second light-shielding layer BM2 is formed into a substantially linear shape extending in the first direction and having the same width in the second direction. The second light-shielding layer BM2 opposed to the gate lines G3 and G4 has the same structure as the structure opposed to the gate line G1. Since the contact holes CH3 of the pixels PX6, PX7 and PX8 are aligned in the substantially straight line in the first direction, the extension portions BME1 of the second light-shielding layer BM2 are formed into a substantially linear shape extending in the first direction and having the same width in the second direction.

The contact hole CH3 of the pixel PX5 is formed near the gate line G2 in the pixel PX2, but the contact holes CH3 of the pixels PX4 and PX6 are formed near the gate line G2 in the pixels PX4 and PX6. Therefore, the second light-shielding layer BM2 opposed to the gate line G2 comprises extension portions BME1 which extend toward the gate line G3 in the pixels PX4 and PX6 and shield the contact holes CH3 of the pixels PX4 and PX6 against light, and an extension portion BME2 which extends toward the gate line G1 in the pixel PX5 and shields the contact hole CH3 of the pixel PX5 formed in the pixel PX2 against light.

A width L1 of the second light-shielding layer BM2, which is opposed to the gate line G2 and includes the extension portions BME1 extending toward the gate line G3 and covering the contact holes CH3, in the second direction is, for example, 13.5 to 16 µm, which is half the pitch between the gate lines of the pixels. A width L2 of the second light-shielding layer BM2, which is opposed to the gate line G2 and includes the extension portion BME2 extending toward the gate line G1 and covering the contact hole CH3, in the second direction is substantially equal to width L1. Therefore, the second light-shielding layer BM2 opposed to the gate line G and extending in the first direction is formed into an indented or zigzag shape partially shifted from the linear shape in the second direction.

Figure 3:
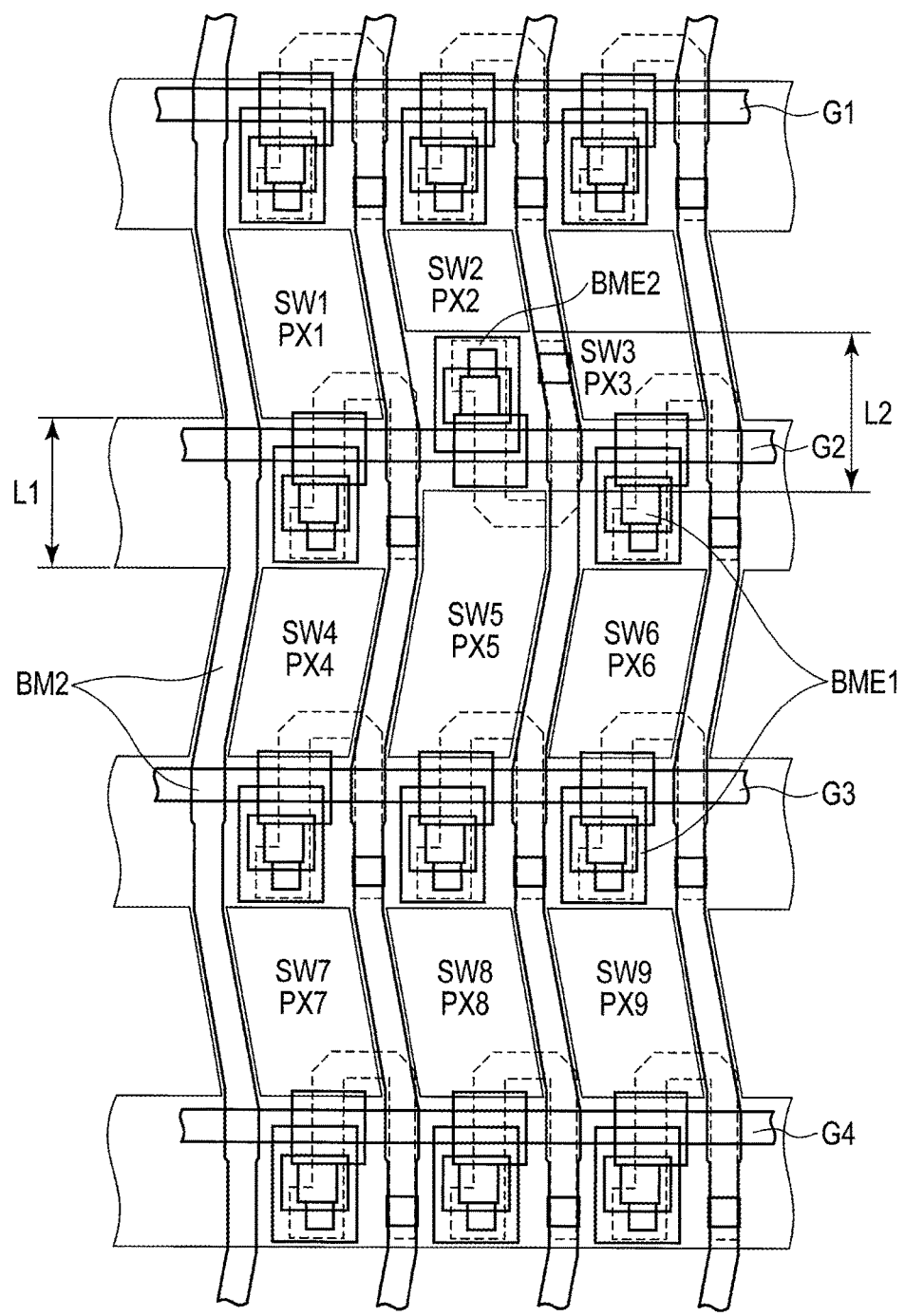
FIG. 3 is a schematic view of the first embodiment in which a light-shielding layer on the counter-substrate CT side overlaps the array substrate AR shown in FIG. 2.

The area of each pixel surrounded by the second light-shielding layer BM2 is an aperture area of the pixel. As shown in FIG. 3, the pixels PX1, PX3, PX4, PX6, PX7, PX8 and PX9 are substantially equal in the aperture area, but the aperture area of the pixel PX2 is less than those of the other pixels because of the extension portion BME1 of the second light-shielding layer BM2 opposed to the gate line G2 and extending toward the gate line G1. The aperture area of the pixel PX5 can be greater than those of the other pixels because the second light-shielding layer BM2 opposed to the gate line G2 extends toward the gate line G1.

Next, a layout of color filters is described. In the first embodiment, a layout of four color filters, i.e., red, green, blue and white filters is described as an example. For example, green filters are disposed in the pixels PX1 and PX4, a white filter is disposed in the pixel PX2, red filters are disposed in the pixels PX3 and PX6 and a blue filter is disposed in the pixel PX5. The blue filter has lower luminance than the red, green and white filters, and the white filter has higher luminance than the red, green and blue filters. Considering an optimal color balance based on the product specification, a layout can be designed such that the aperture area of the blue pixel is greater than those of the other pixels and the aperture area of the white pixel is less than those of the other pixels. In the first embodiment, the optimal color balance can be implemented by disposing the blue filter in the pixel PX5 having a large aperture area and disposing the white filter in the pixel PX2 having a small aperture area.

As the demand for high definition increases, the pixel size becomes smaller and it becomes difficult to reduce the pitch between the source lines below a certain degree. According to the present embodiment, the aperture area can be different for each pixel by making the position of the contact hole CH3 of the switching element SW on the array substrate AR side different from that of the adjacent pixel and making the second light-shielding layer on the counter-substrate CT side have the constant width and shield the contact holes CH3 of the respective pixels against light.

Figure 7:
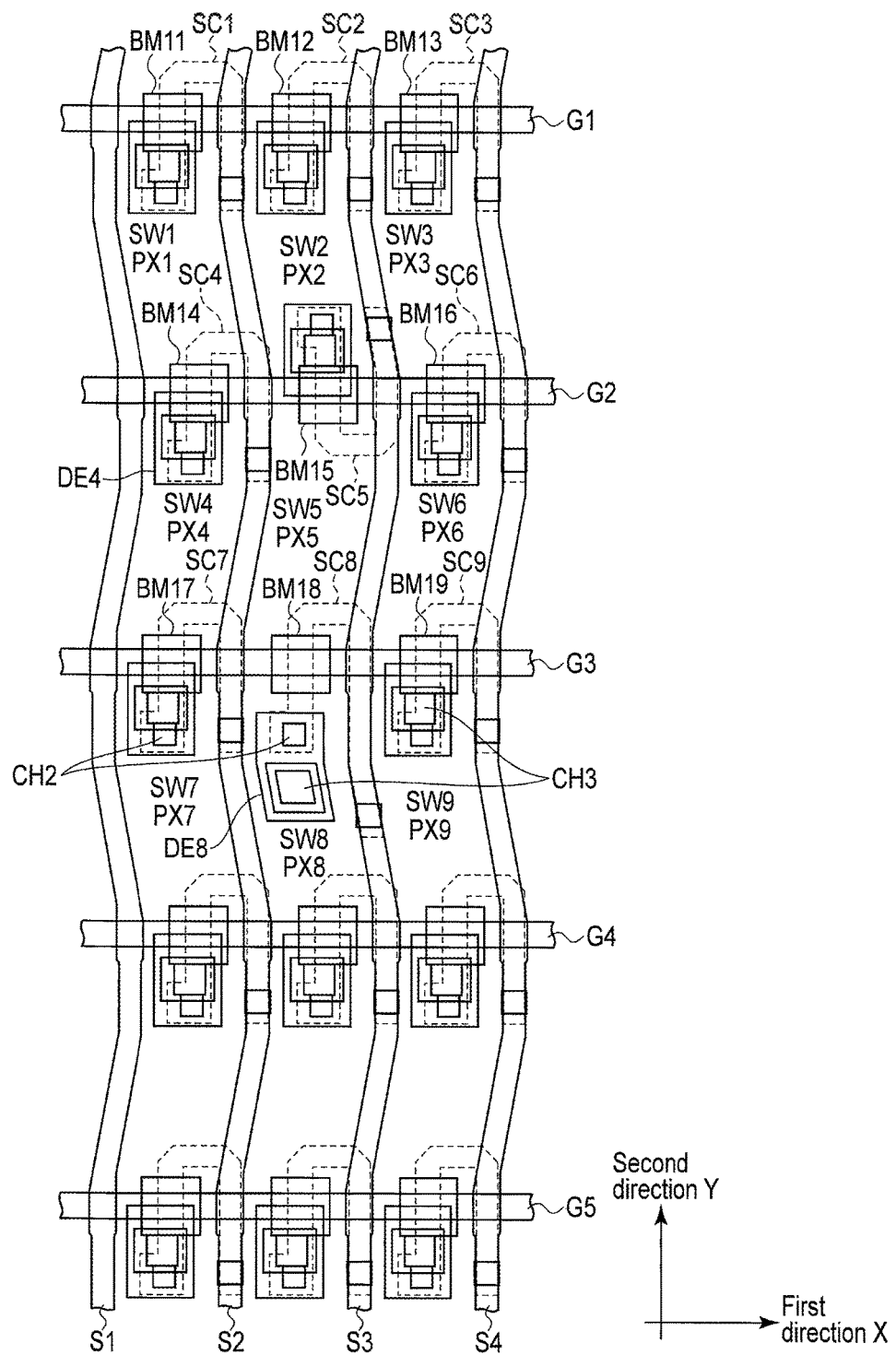
FIG. 7 is a schematic view of an array substrate AR of a second embodiment from the counter-substrate side.
Figure 8:
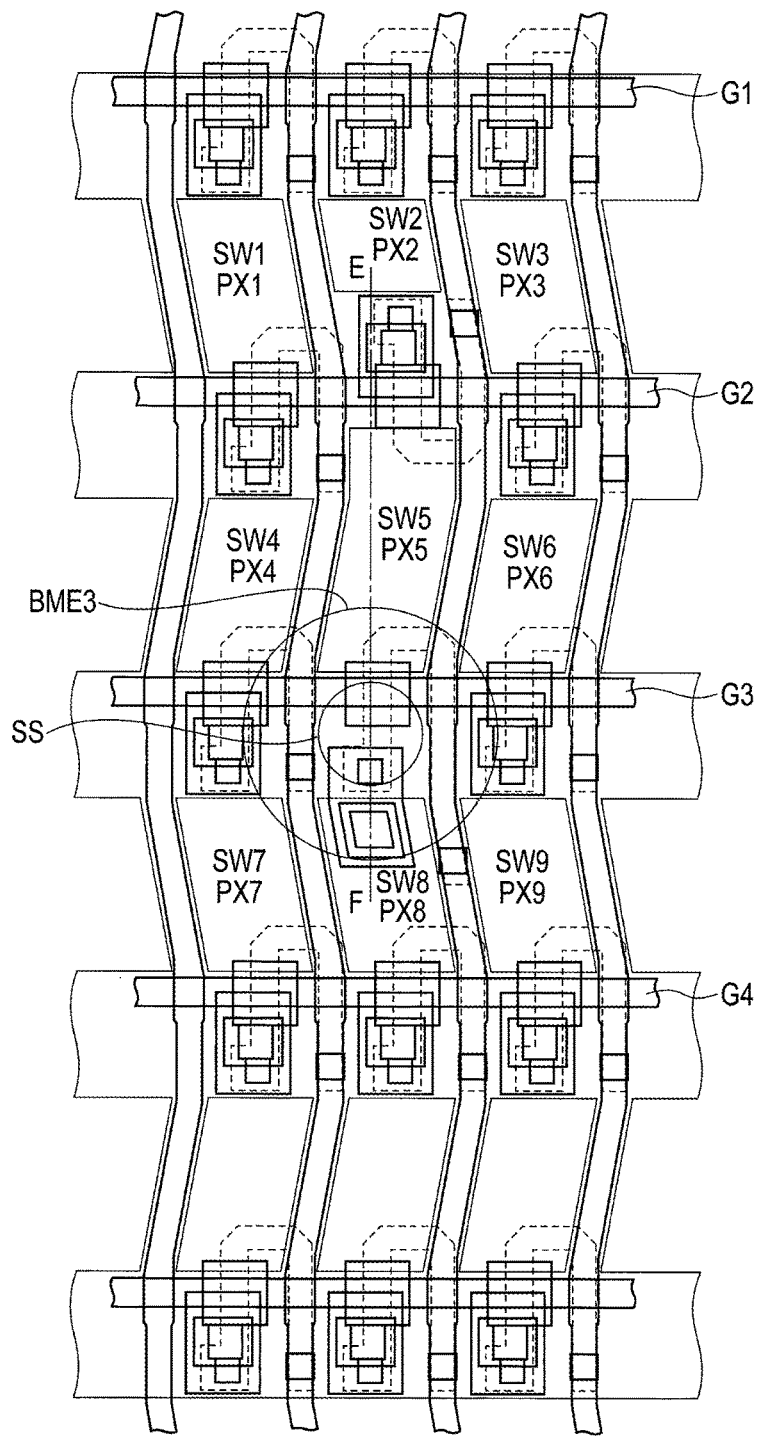
FIG. 8 is a schematic view of the second embodiment in which a light-shielding layer and a spacer on the counter-substrate CT overlap the array substrate AR shown in FIG. 7.
Figure 9:
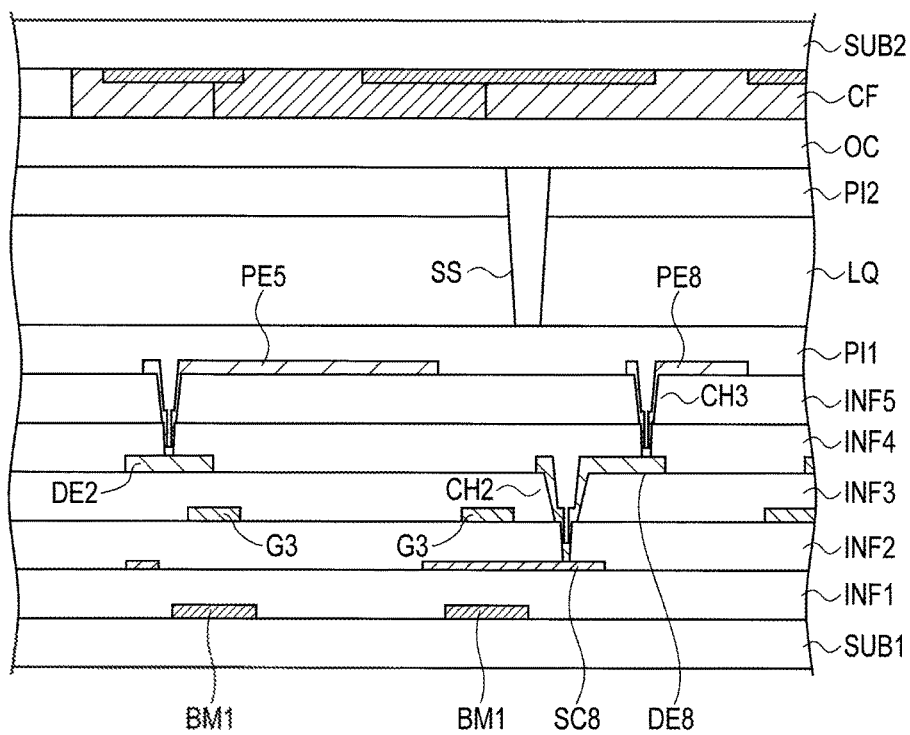
FIG. 9 is a cross-sectional view along E-F of FIG. 8.

A second embodiment is described below with reference to FIG. 7 to FIG. 9. FIG. 7 is a schematic view of an array substrate AR of the second embodiment from the counter-substrate side. FIG. 8 is a schematic view in which a light-shielding layer BM2 and a spacer SS on the counter-substrate CT overlap the array substrate AR shown in FIG. 7. FIG. 9 is a cross-sectional view along E-F of FIG. 8.

As shown in FIG. 7, the structures of the pixels PX1 to PX7 and PX9 are substantially the same as those of the first embodiment described above with reference to FIG. 2, and detailed description is omitted. The second embodiment is different from the first embodiment in that the switching element SW8 of the pixel PX8 has a different structure and the spacer SS is provided. The semiconductor layer SC8 of the switching element SW8 is connected to the source line S3 via the contact hole CH1, extends along the source line S3 toward the gate line G3, is bent toward the source line S2 at a point beyond the gate line G3, extends in the first direction, is bent toward the gate line G3 roughly at the center of the short side (gate line G3) of the pixel PX8, and extends beyond the gate line G3. The relay electrode DE8 of the pixel PX8 extends roughly to the center of the pixel PX8 toward the gate line G4, is connected to the end of the semiconductor layer SC8 near the gate line G3 via the contact hole CH2, and is connected to the pixel electrode PE8 at the center of the pixel via the contact hole CH3. Differently from the contact holes CH3 of the pixels PX1 to PX7 and PX9 each formed between the contact hole CH2 and the gate line G, the contact hole CH2 of the pixel PX8 is formed between the gate line G and the contact hole CH3.

As shown in FIG. 8 and FIG. 9, a spacer SS which defines cell gap is formed on the overcoat layer OC of the counter-substrate CT and is in contact with the first alignment film PI1 on the array substrate AR side. For example, the spacer SS is a columnar spacer. In the present embodiment, the spacer SS is disposed above the relay electrode DE8 of the pixel PX8, more specifically between the gate line G3 and the contact hole CH3. The contact hole CH2 is planarized by the fourth insulating film INF4 and thus the portion in contact with the spacer SS may be above the gate line G3 and the contact hole CH2. The spacer SS may partly overlap the contact portion of the pixel electrode PE8.

The spacer SS may be formed integrally with the overcoat layer OC by a halftone exposure, etc., in a formation process of the overcoat layer OC, or may be formed independently of the overcoat layer OC by using a spacer material. If the second light-shielding layer BM2 is formed on the color filters CF, the spacer SS may be formed integrally with the second light-shielding layer BM2 by using the same material.

The spacer SS is in contact with the first alignment film PI1 of the array substrate AR to prevent a change in cell gap caused by a press by the user, but the spacer and the first alignment film PI1 grind against each other, which may result in light leakage around the spacer. A rubbing failure around the spacer SS may also cause light leakage. In order to prevent light leakage, a spacer light-shielding portion BME3 should preferably be provided around the spacer SS in the same layer as the second light-shielding layer BM2 integrally with the second light-shielding layer BM2. The spacer light-shielding portion BME3 is formed into, for example, a circle about 33 µm in diameter, covers the contact hole CH3 of the pixel PX8 and covers part of each of the pixels PX4 to PX9 around the spacer SS. The shape of the spacer light-shielding portion BME3 is not limited to a circle but may be a polygon such as an octagon.

The overlap between the second light-shielding layer BM2 and the array substrate AR is the same as FIG. 3 of the first embodiment in that the contact hole CH3 of the pixel PX5 is formed in the pixel PX2 and part of the second light-shielding layer BM2 opposed to the gate line G2 is indented, but is different in that the spacer light-shielding portion BME3 is provided. Accordingly, the aperture ratio formed by the second light-shielding layer BM2 is different from that in the first embodiment. For example, the pixels PX1 and PX3 not covered with the spacer light-shielding portion BME3 have large aperture areas, and the pixels PX4, PX6, PX7 and PX9 partially covered with the spacer light-shielding portion BME3 have aperture areas less than those of the pixels PX1 and PX2. Since the pixel PX2 includes the contact hole CH3 of the pixel PX5, the pixel PX2 has a small aperture area in the same manner as the first embodiment because of the extension portion BME2 of the second light-shielding layer BM2 opposed to the gate line G2 and extending toward the pixel PX2. The pixel PX8 also has a small aperture area because the pixel area is largely covered with the spacer light-shielding portion BME3. The aperture area of the pixel PX5, which is relatively large in the first embodiment, is relatively small because of the spacer light-shielding portion BME3 but is greater than those of the pixels PX2 and PX8 in the second embodiment.

A layout of color filters in the second embodiment is described. In the second embodiment, the use of three color filters, i.e., red, green and blue filters is described as an example. For example, green filters are disposed in the pixels PX1, PX6 and PX7, blue filters are disposed in the pixels PX2 and PX8, and red filters are disposed in the pixels PX3, PX5 and PX9. In contrast to the first embodiment in which the color balance is adjusted by adding a white pixel to red, green and blue pixels, the overall color balance is attained in the second embodiment by using red, green and blue pixels and allocating blue pixels to the pixels PX2 and PX8 having a small aperture ratio. Of the additive primary colors, green has the highest luminous efficacy. If the spacer SS is formed in an area corresponding to a green pixel having high luminance, there is a possibility that display quality is deteriorated by a pattern streak of the spacer light-shielding portion BME3 which is greater than the pixels. According to the second embodiment, an arbitrary aperture area can be assigned to each pixel without changing a distance between the source lines in the same manner as the first embodiment. In addition, the influence on the display quality can be reduced and the color balance can be optimized by disposing the spacer SS in the spacer light-shielding portion BME3 which shields an area corresponding to pixels of two relatively inconspicuous colors against light.

The layout of the color filters is not limited to the above-described example provided that the spacer light-shielding portion BME3 is disposed in an area corresponding to pixels of two inconspicuous colors in order to reduce a pattern streak of the spacer light-shielding portion BME3. For example, the pixel PX8 may be red and the pixel PX5 may be blue.

FIG. 10 shows a modified example of the second embodiment. In the modified example of the second embodiment, pixels PX10 to PX12 defined by gate lines G4 and G5 and source lines S1 to S4 are provided in addition to the pixels PX1 to PX9 of the second embodiment.

The pixel PX10 is adjacent to the pixel PX7 in the second direction. A switching element SW10 of the pixel PX10 has the same structure as the switching element SW4 of the second embodiment. The pixel PX12 is adjacent to the pixel PX9 in the second direction. A switching element of the pixel PX12 has the same structure as the pixel PX10.

The switching element SW8, the spacer SS and the spacer light-shielding portion BME3 are formed in the pixel PX8 in the second embodiment, but are formed in the pixel PX11 in the modified example of the second embodiment. The switching elements SW5 and SW8 of the pixels PX5 and PX8 of the modified example of the second embodiment have the same structure as the switching element SW8 of the pixel PX8 of the second embodiment.

That is, in the modified example of the second embodiment, the contact holes CH3 of the pixels PX1, PX2, PX3, PX4, PX6, PX7, PX9, PX10, PX11 and PX12 are formed in the respective pixels, but the contact holes CH3 of the pixels PX5 and PX8 are formed in the pixels PX2 and PX5, respectively.

The structure of the second light-shielding layer BM2 of the modified example of the second embodiment is described. The second light-shielding layer BM2 opposed to the gate line G1 has a substantially linear shape having extension portions BME1 on the gate line G2 side so as to cover the contact holes CH3 of the pixels PX1 to PX3. The second light-shielding layer BM2 opposed to the gate line G2 has an indented or zigzag shape having extension portions BME1 on the gate line G3 side in the pixels PX4 and PX6 to cover the respective contact holes CH3, and an extension portion BME2 on the gate line G1 side in the pixel PX5 since the contact hole CH3 of the pixel PX5 is formed in the pixel PX2. The second light-shielding layer BM2 opposed to the gate line G3 has an indented shape having extension portions BME1 on the gate line G4 side in the pixels PX7 and PX9 to cover the respective contact holes CH3, and an extension portion BME2 on the gate line G2 side in the pixel PX8 since the contact hole CH3 of the pixel PX8 is formed in the pixel PX5. The second light-shielding layer BM2 opposed to the gate line G4 is formed integrally with the spacer light-shielding portion BME3 of the pixel PX11 and has extension portions BME1 on the gate line G5 side to cover the contact holes CH3 of the pixels PX10 and 12. The spacer light-shielding portion BME3 is formed around the spacer in the pixel PX11, covers the contact hole CH3 of the pixel PX11 and part of each of the pixels PX7 to PX12, and is connected to the second light-shielding layer BM2 in the pixels PX10 and 12.

With respect to the aperture areas of the pixels PX1 to PX12 of the modified example of the second embodiment, as shown in FIG. 10, the aperture areas of the pixels PX11 and PX2 are less than those of the other pixels because the spacer SS and the spacer light-shielding portion BME3 are disposed in the pixel PX11, and the pixel PX2 is covered with the extension portion BME2 of the second light-shielding layer BM2 extending toward the gate line G1. Of the twelve pixels described in the modified example, the pixels PX1, PX3, PX4, PX5 and PX6 have the largest aperture areas. With respect to the pixel PX8, the extension portion BME2 of the second light-shielding layer BM2 opposed to the gate line G3 is formed on the gate line G2 side, and the pixel area is largely covered with the spacer light-shielding portion BM3. As a result, the aperture area of the pixel PX8 is less than that of the pixel PX1 but greater than those of the pixels PX2 and PX11. The aperture areas of the pixels PX7, PX9, PX10 and PX12 are less than that of the pixel PX1 because being partly covered with the spacer light-shielding portion BME3, but are greater than those of the pixels PX2 and PX11.

Next, a layout of color filters of the modified example of the second embodiment is described. In the modified example of the second embodiment, three color filters, i.e., red, green and blue filters are used, and the blue filter is disposed in a pixel having the smallest aperture area in the same manner as the second embodiment. For example, the red filters are disposed in the pixels PX3, PX4, PX8 and PX12, the green filters are disposed in the pixels PX1, PX5, PX9 and PX10, and the blue filters are disposed in the pixels PX2, PX6, PX7 and PX11.

According to the modified example of the second embodiment, an arbitrary aperture area can be assigned to each pixel without changing a distance between the source lines in the same manner as the first embodiment. In addition, the influence on the display quality can be reduced and the color balance can be optimized by disposing the spacer SS in the spacer light-shielding portion BME3 which shields an area corresponding to pixels of two relatively inconspicuous colors against light.

A third embodiment is described with reference to FIG. 11, FIG. 12 and FIG. 13. The third embodiment has substantially the same structure as the first embodiment except that a first spacer SSA formed on the array substrate AR side and a second spacer SSC formed on the counter-substrate CT side and in contact with the first spacer SSA are provided. Cell gab in the liquid crystal layer is defined by the contact between the first spacer SSA and the second spacer SSC.

Figure 11:
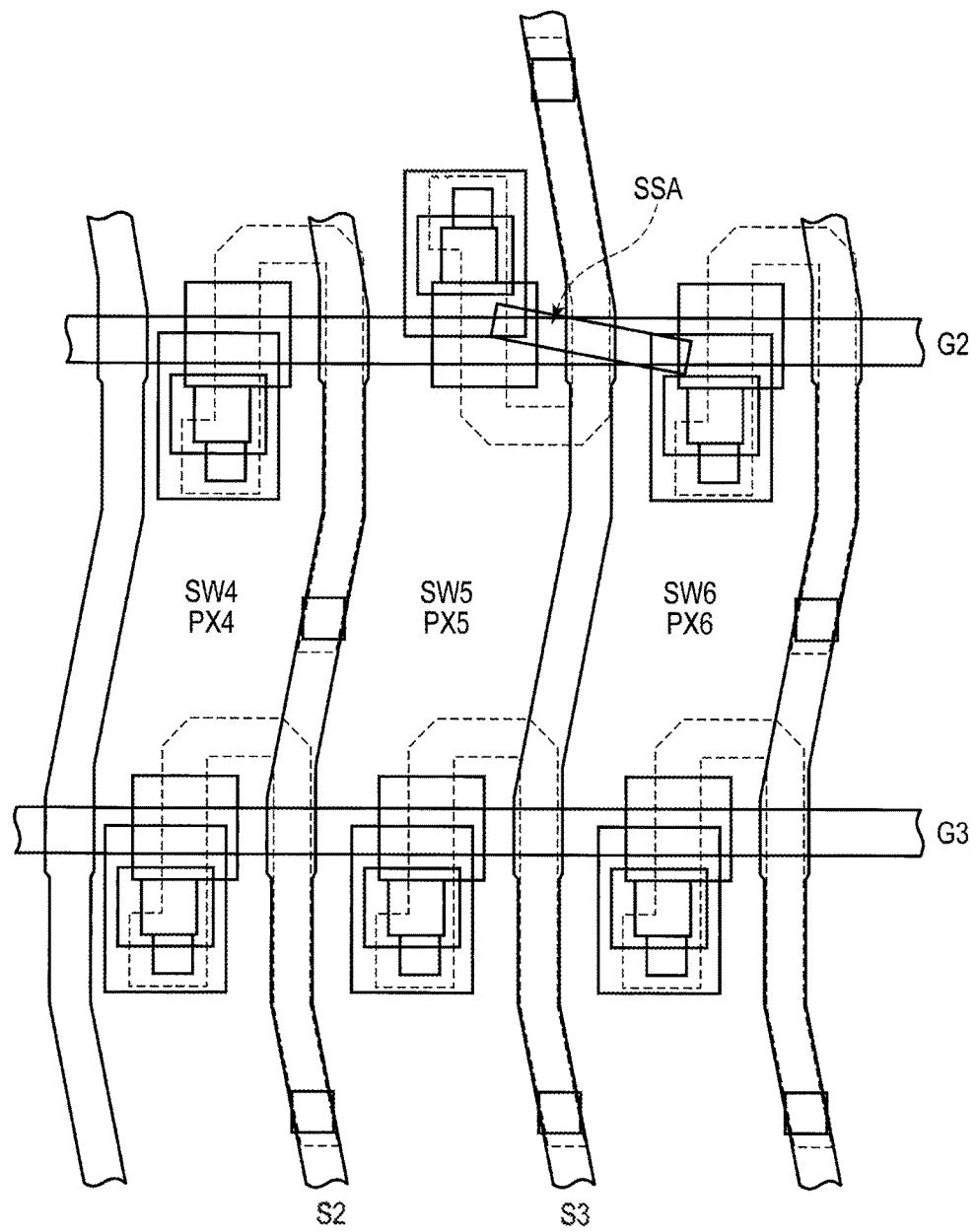
FIG. 11 is a schematic view of pixels in an array substrate AR of a third embodiment from the counter-substrate CT side.

FIG. 11 is a schematic view of the array substrate AR of the third embodiment from the counter-substrate CT side. FIG. 11 shows that the first spacer SSA is added to the structure of the first embodiment on the array substrate side shown in FIG. 2. The pixel structure including the switching elements and the relationship between the pixels and the light-shielding layer shown in FIG. 11 and FIG. 12 are the same as those in FIG. 4.

Figure 12:
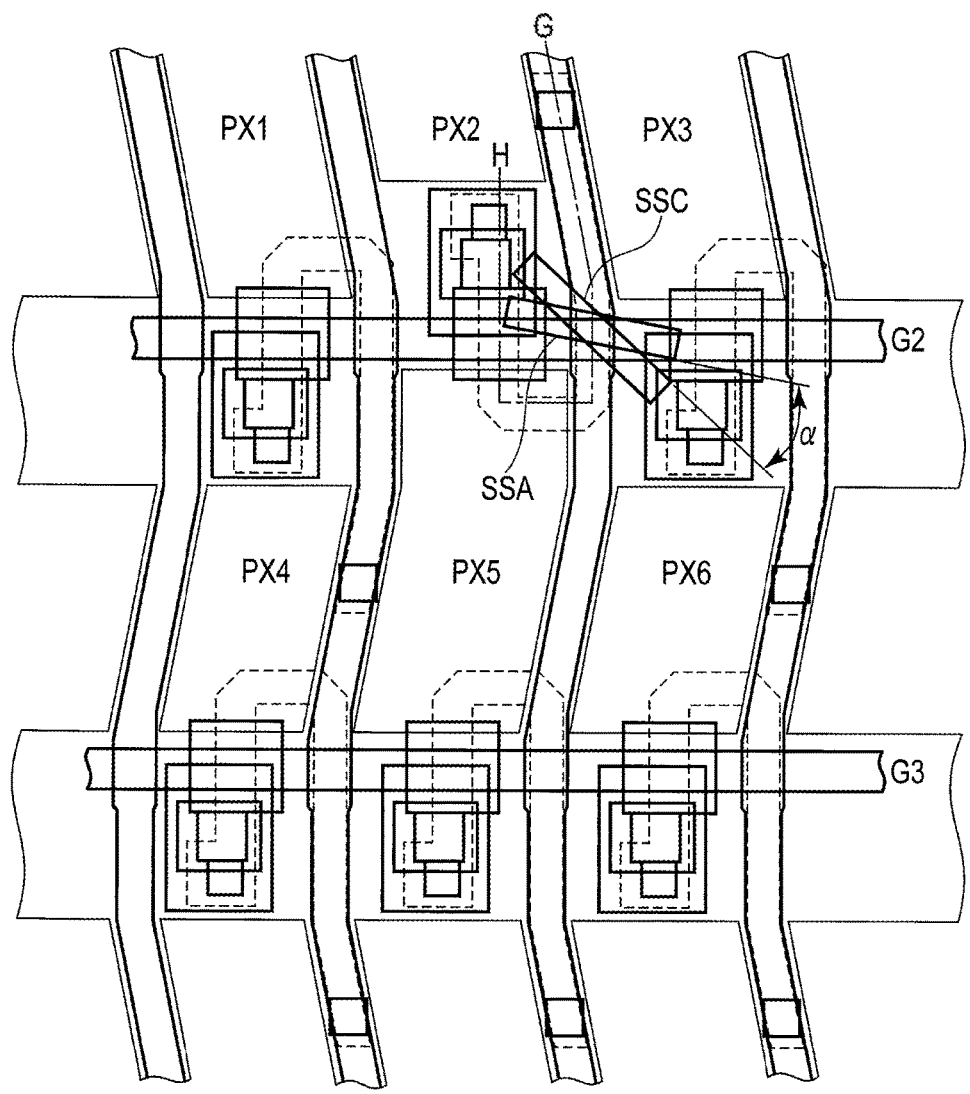
FIG. 12 is a schematic view of the third embodiment in which a light-shielding layer and a spacer on the counter-substrate CT side overlap the array substrate AR shown in FIG. 11.

In FIG. 12, the second light-shielding layer BM2 and the second spacer SSC formed on the counter-substrate CT overlap the array substrate AR of the third embodiment. The second spacer SSC is formed to cross the first spacer SSA.

One end of the first spacer SSA is disposed in an area of the pixel PX2 overlapping the extension portion BME2 of the second light-shielding layer BM2 opposed to the gate line G2 extending toward the gate line G1, and the other end is disposed in an area of the pixel PX6 overlapping the extension portion BME1 of the second light-shielding layer BM2 opposed to the gate line G2 extending toward the gate line G3.

One end of the second spacer SSC is disposed in an area of the pixel PX2 overlapping the second light-shielding layer BM2 opposed to the gate line G2 and the extension portion BME2 of the second light-shielding layer BM2 extending toward the gate line G1, and the other end is disposed in an area of the pixel PX6 overlapping the second light-shielding layer BM2 opposed to the gate line G2 and the extension portion BME1 of the second light-shielding layer BM2 extending toward the gate line G3. The angle between the first spacer SSA and the second spacer SSC is an angle α which is greater than 0° and less than 90°.

Figure 13:
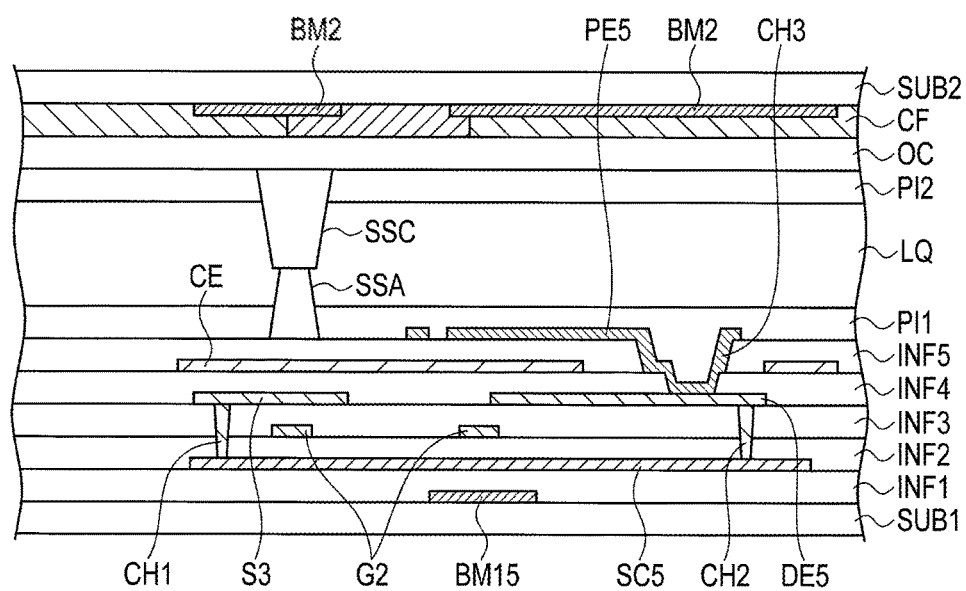
FIG. 13 is a cross-sectional view along G-H of FIG. 12.

FIG. 13 is a cross-sectional view along G-H of FIG. 12. The first spacer SSA is formed on the fifth insulating film INF5, which is not shown in FIG. 13. The first alignment film PI1 may be formed to cover the first spacer SSA or to cover the side surfaces of the first spacer SSA without covering the top surface. The first spacer SSA may be formed on the first alignment film PI1. The first spacer SSA is formed on the fifth insulating film in the present embodiment, but may be formed integrally with the fourth insulating film. The first spacer SSA may be formed on the pixel electrode PE or may partly overlap the pixel electrode PE.

The second spacer SSC is formed on the overcoat layer OC. The second alignment film PI2 may be formed to cover the second spacer SSC or to cover the side surfaces of the second spacer SSC without covering the top surface. The second spacer SSC may be formed on the second alignment film PI2. The second spacer SSC is formed on the overcoat layer OC in the present embodiment, but may be formed integrally with the overcoat layer OC. If the second light-shielding layer BM2 is formed on the color filters, the second spacer SSC may be formed of the same material as the second light-shielding layer BM2.

As shown in FIG. 11 to FIG. 13, the first spacer SSA is formed in the same layer as the pixel electrode PE and disposed so as not to be in contact with the contact hole CH3.

In addition to the above structure, the first spacer SSA shown in FIG. 11 may further comprise another first spacer SSA having one end disposed in an area of the pixel PX2 overlapping the extension portion BME2 of the second light-shielding layer BM2 opposed to the gate line G2 extending toward the gate line G1 and the other end disposed in an area of the pixel PX4 overlapping the extension portion BME1 of the second light-shielding layer BM2 opposed to the gate line G2 extending toward the gate line G3. In the same manner, in addition to the above structure, the second spacer SSC shown in FIG. 11 may further comprise another second spacer SSC having one end disposed in an area of the pixel PX2 overlapping the second light-shielding layer BM2 opposed to the gate line G2 and the extension portion BME2 of the second light-shielding layer BM2 extending toward the gate line G1 and the other end disposed in an area of the pixel PX4 overlapping the second light-shielding layer BM2 opposed to the gate line G2 and the extension portion BME1 of the second light-shielding layer BM2 extending toward the gate line G3.

Figure 14:
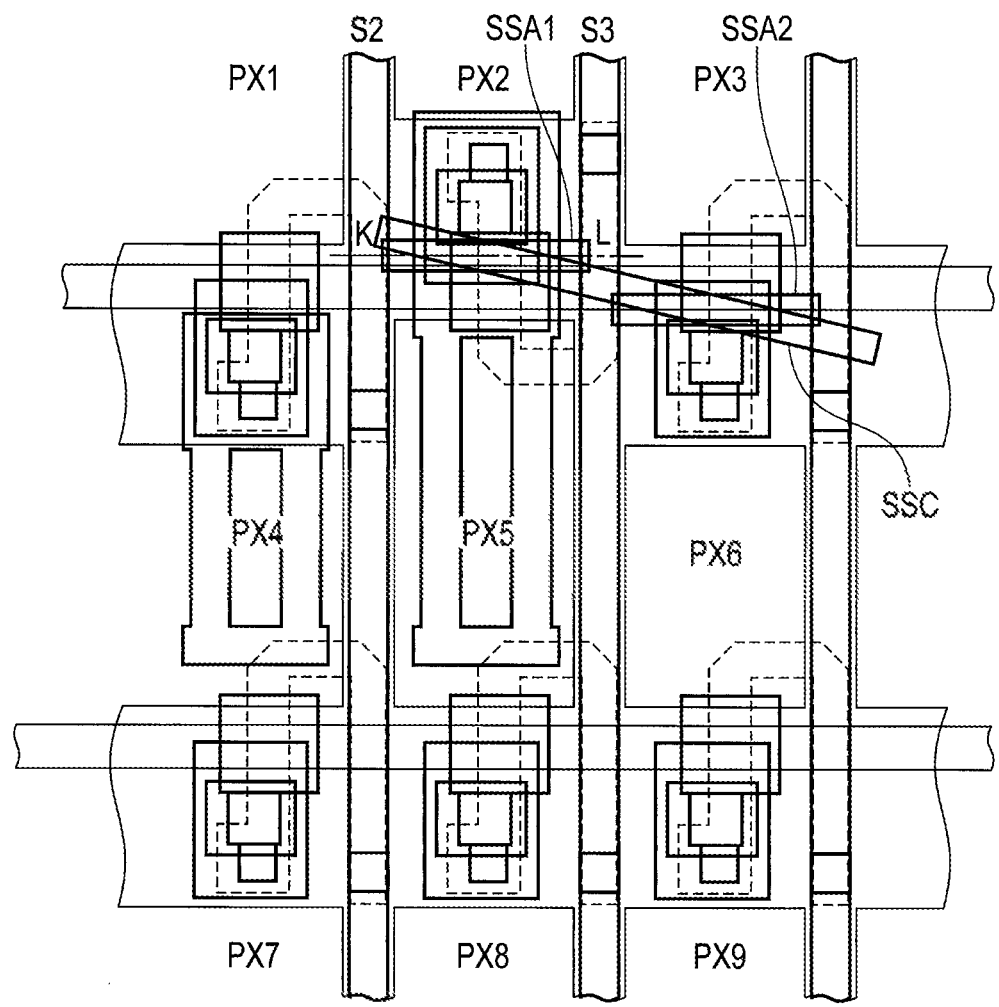
FIG. 14 is a schematic view of a modified example of the third embodiment in which a light-shielding layer and a spacer on the counter-substrate CT side overlap the array substrate AR.

A modified example of the third embodiment is described below with reference to FIG. 14 and FIG. 15. In FIG. 14, the second light-shielding layer BM2 and the spacer of the counter-substrate CT overlap the array substrate AR of the modified example of the third embodiment. In the structure of the array substrate AR side, the first spacer SSA is disposed in a different position from the third embodiment.

The first spacers SSA (SSA1, SSA2) on the array substrate AR side are formed in the pixels PX2 and PX6, respectively, and are formed on the pixel electrode PE5 between the contact hole CH2 and the gate line G2. A first spacer SSA1 is disposed in an area overlapping the extension portion BME2 of the second light-shielding layer BM2 opposed to the gate line G2 extending toward the gate line G1, and a first spacer SSA2 is disposed in an area of the pixel PX6 overlapping the extension portion BME1 of the second light-shielding layer BM2 opposed to the gate line G2 extending toward the gate line G3.

One end of the second spacer SSC on the counter-substrate CT side is disposed in an area of the pixel PX2 overlapping the second light-shielding layer BM2 opposed to the gate line G2 and the extension portion BME2 of the second light-shielding layer BM2 extending toward the gate line G1 and is in contact with the first spacer SSA1 of the pixel PX2, and the other end is disposed in an area of the pixel PX6 overlapping the second light-shielding layer BM2 opposed to the gate line G2 and the extension portion BME1 of the second light-shielding layer BM2 extending toward the gate line G3 and is in contact with the first spacer SSA2 of the pixel PX6. In the pixel PX2, the angle between the first spacer SSA1 and the second spacer SSC is an angle α which is greater than 0° and less than 90°. In the pixel PX6, the angle between the first spacer SSA2 and the second spacer SSC is an angle α which is greater than 0° and less than 90°. The angle between the spacers in the pixel PX2 may be equal to or different from that in the pixel PX6.

A layout of color filters in the third embodiment and above described modified examples of the third embodiment is described. For example, in the same manner as the first embodiment, green filters are disposed in the pixels PX1 and PX4, red filters are disposed in the pixels PX3 and PX6, a white filter is disposed in the pixel PX5 having a small aperture area and a blue filter is disposed in the pixel PX8 having a large aperture area. Alternatively, the layout may be designed without using a white filter by, for example, disposing green filters in the pixels PX1 and PX4, disposing blue filters in the pixels PX2 and PX5 and disposing red filters in the pixels PX3 and PX6.

The structure in which spacers formed in the array substrate and the counter-substrate, respectively, cross each other is known. In this case, the second light-shielding layer BM2 should be expanded to shield the periphery of the spacer in the same manner as the spacer light-shielding portion described in the second embodiment. In addition, a large spacer light-shielding portion should be formed considering displacement at the time of bonding the array substrate and the counter-substrate together. As a result, the aperture areas of the pixels are reduced. The spacers on the array substrate side and the counter-substrate side should preferably be as small as possible, but in this case there is a possibility that the spacers cannot be in contact with each other due to the displacement.

According to the third embodiment and the modified example, the periphery of the first spacers SSA and the second spacer SSC is largely covered by the second light-shielding layer BM2 and the extension portions thereof. Therefore, it is not necessary to provide a spacer light-shielding portion individually, and the large aperture area can thereby be achieved. In addition, since spacers can be long and the first spacers and the second spacer intersect with each other at a small angle greater than 0° and less than 90°, a large margin for the contact between the spacers can be ensured even in the case of the displacement of the array substrate and the counter-substrate.

The first embodiment, in particular the structure of the switching elements of the pixels PX4 and PX5 and the combination of the structure and the second light-shielding layer BM2 are described as the second embodiment, the modified example of the second embodiment, the third embodiment and the modified example of the third embodiment, but the embodiments are not limited to those. For example, the switching element structure of the pixels PX4 to PX6 and the second light-shielding layer BM2 of the first embodiment or the third embodiment, or the pixels PX4 to PX9 of the second embodiment may be used as a pixel unit, and the pixel units may be disposed in several positions in the active area, disposed only in the spacer installation positions or arranged continuously and regularly in the first and second directions.

FIG. 16 is a schematic view of distribution of the spacers of the second embodiment.

As shown in FIG. 16, the second embodiment comprises sub-spacers SubSS in addition to the spacers SS. The sub-spacers SubSS are lower than the spacers SS and are formed in the counter-substrate CT together with the spacers SS. For example, one spacer SS and nineteen sub-spacers SubSS are disposed in sixty pixels surrounded by dashed lines in FIG. 16. FIG. 16 shows only the layout of the spacers SS and the sub-spacers SubSS and does not show the second light-shielding layer BM2, but the structure shown in FIG. 8 is provided in a position of each spacer SS. FIG. 8 does not show the sub-spacers, but as shown in FIG. 16, the sub-spacers SubSS are disposed at intersections of the source lines and the gate lines in contrast to the spacers SS disposed between adjacent source lines. Each sub-spacer SubSS comprises a spacer light-shielding portion in the same manner as the spacers SS, but the spacer light-shielding portion of each sub-spacer SubSS is less than the spacer light-shielding portion BME2 of each spacer SS.

Figure 18:
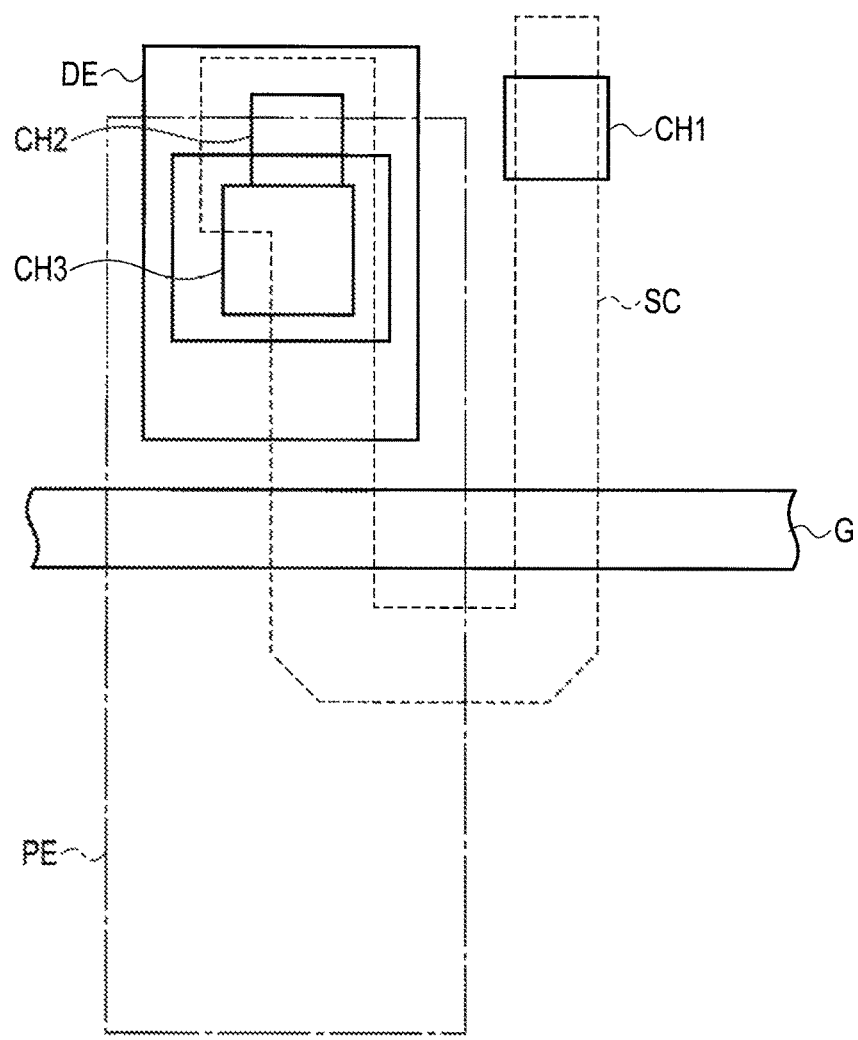
FIG. 18 is an illustration of a second pixel pattern of the embodiments.
Figure 19:
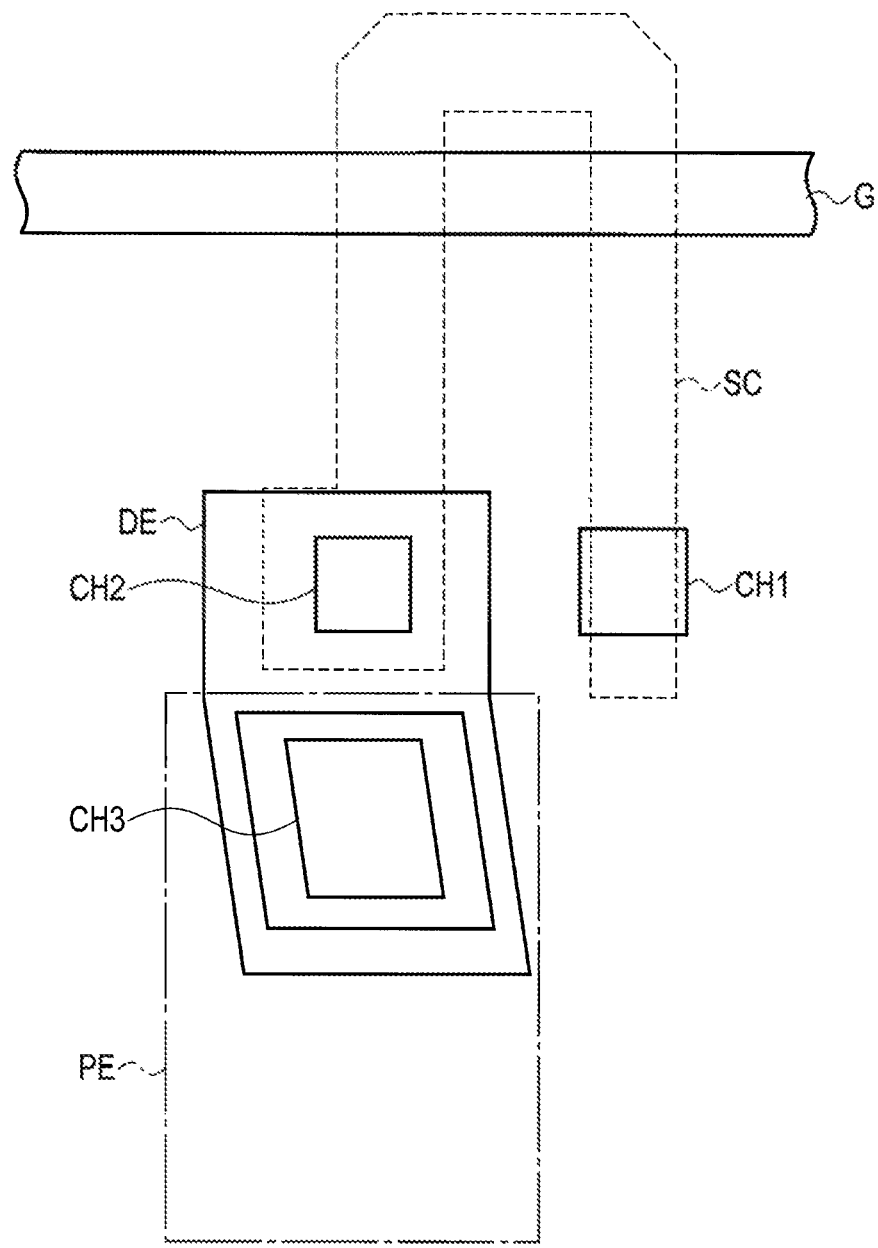
FIG. 19 is an illustration of a third pixel pattern of the embodiments.

The embodiments are not limited to the first to third embodiments and their modified examples, and may be an arbitrary combination of the first pixel pattern shown in FIG. 17, the second pixel pattern shown in FIG. 18 and the third pixel pattern shown in FIG. 19.

The first pixel pattern shown in FIG. 17 is a pixel pattern comprising a contact hole CH3 formed on one side of the gate line G in the second direction and electrically connecting a pixel electrode PE and a semiconductor layer SC, and the pixel electrode PE extending from the contact hole CH3 toward one side in the second direction, in the same manner as the switching element SW4 of the pixel PX4 of FIG. 4.

The second pixel pattern shown in FIG. 18 is a pixel pattern comprising a contact hole CH3 formed on the other side of the gate line G in the second direction and electrically connecting a pixel electrode PE and a semiconductor layer SC, and the pixel electrode PE extending from the contact hole CH3 toward one side in the second direction, in the same manner as the switching element SW5 of the pixel PX5 of FIG. 4.

As shown in FIG. 19, the third pixel pattern is a pixel pattern comprising a contact hole CH2 formed on one side of the gate line G in the second direction and electrically connecting a relay electrode DE and a semiconductor layer SC, a contact hole CH3 electrically connecting the relay electrode DE and a pixel electrode PE, and the pixel electrode PE extending from the contact hole CH3 toward one side in the second direction, the contact hole CH2 being formed between the gate line G and the contact hole CH3, in the same manner as the switching element SW8 of the pixel PX8 of FIG. 8.

Figure 20:
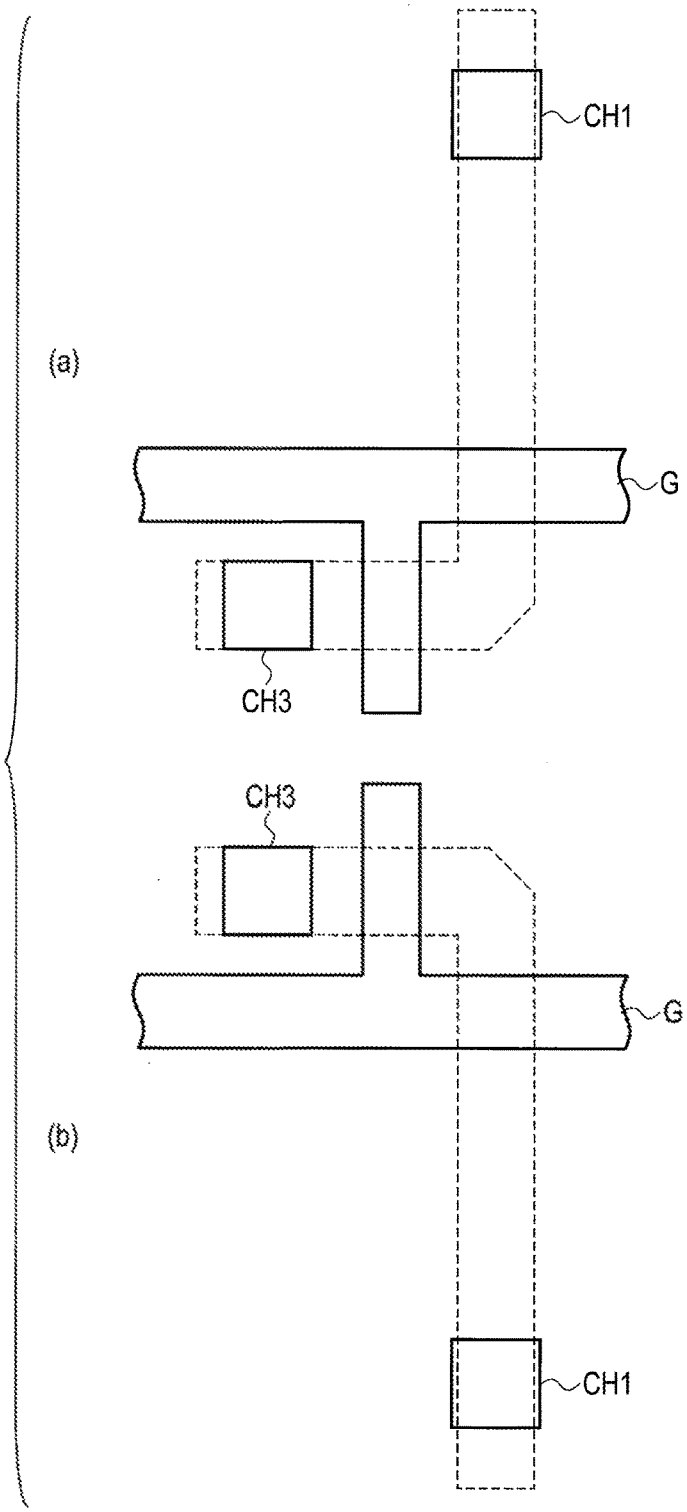
FIG. 20 is an illustration of other shapes of the semiconductor layer of the pixel pattern.

The semiconductor layers SC in the first to third pixel patterns may have different shapes. The double-gate structure formed by crossing the U- or J-shaped semiconductor layer SC with the gate line G at two points is described above, but the double-gate structure may be formed by using the L-shaped semiconductor layer SC as shown in FIG. 20. FIG. 20 (a) shows the shape of the semiconductor layer SC of the first pixel pattern and FIG. 20 (b) shows the shape of the semiconductor layer SC of the second pixel pattern. Otherwise, different shapes may be combined such that the shape of the semiconductor layer SC of the first pixel pattern is different from the shape of the semiconductor layer SC of the second pixel pattern. The first pixel pattern and the second pixel pattern are substantially symmetrical in the above description, but the L-shaped semiconductor layer and the U-shaped semiconductor layer may be used in combination.

The light-shielding layer BM2 of the counter-substrate CT corresponding to the first pixel pattern and the second pixel pattern basically shields the gate lines G and the contact holes CH3 against light, and the contact holes CH3 of the first pixel pattern and the second pixel pattern are disposed on the opposite sides of the gate line G in the second direction. Therefore, the light-shielding layer BM2 has different central axes in the first pixel pattern and the second pixel pattern.

With respect to a portion in which a spacer is formed, the third pixel pattern can be used to form a columnar spacer near the gate line G without overlapping the contact hole CH3. In this case, the spacer light-shielding portion BME3 can be used to shield the gate line G and the contact hole CH3 of the third pixel pattern against light.

If the light-shielding layer BM2 opposed to the first pixel pattern and the second pixel pattern is used, cell gap can be formed without reducing the aperture ratio by using the spacers formed in the array substrate AR and the counter-substrate CT, respectively, shown in the third embodiment and the modified example of the third embodiment.

The display devices described in the above embodiments may be summarized as follows.

(1) A display device comprises:

a first substrate comprising source lines arranged in a first direction, gate lines arranged in a second direction, a first switching element and a second switching element connected to a first gate line which is one of the gate lines, a first pixel electrode which is electrically connected to the first switching element via a first contact hole formed on one side of the first gate line in the second direction and extends toward the one side in the second direction, and a second pixel electrode which is electrically connected to the second switching element via a second contact hole formed on other side of the first gate line in the second direction and extends toward the one side in the second direction beyond the first gate line; and a second substrate opposed to the first substrate.

(2) The display device of (1) further comprises:

a first source line electrically connected to the first switching element;

a second source line electrically connected to the second switching element;

a third contact hole connecting the first switching element to the first source line and formed on the one side in second direction; and a fourth contact hole connecting the second switching element to the second source line and formed on the other side in second direction.

(3) In the display device of (2), the first switching element comprises a first semiconductor layer having a first shape and crossing the first gate line, and the second switching element comprises a second semiconductor layer having a second shape and crossing the first gate line.

(4) The display device of any one of (1) to (3) further comprises:

a first light-shielding portion formed on the second substrate, opposed to the first gate line and the first contact hole and having a first width; and a second light-shielding portion formed on the second substrate, opposed to the first gate line and the second contact hole and having a width substantially equal to the first width.

(5) The display device of (4) further comprises:

a first spacer formed on the first substrate; and a second spacer formed on the second substrate and in contact with the first spacer, one end of the first spacer is formed in an area overlapping the first light-shielding portion, the other end of the first spacer is formed in an area overlapping the second light-shielding portion, one end of the second spacer is formed in an area overlapping a first light-shielding layer, the other end of the second spacer is formed in an area overlapping a second light-shielding layer, and the first spacer and the second spacer cross each other at an angle greater than 0° and less than 90°.

(6) The display device of (4) further comprises:

a first spacer and a second spacer formed on the first substrate; and a third spacer formed on the second substrate and in contact with the first spacer and the second spacer, the first spacer is formed in an area overlapping the first light-shielding layer, the second spacer is formed in an area overlapping the second light-shielding layer, one end of the third spacer is in contact with the first spacer in the area overlapping the first light-shielding layer, and the other end of the third spacer is formed in the area overlapping the second light-shielding layer and in contact with the second spacer.

(7) A display device comprises:

an array substrate comprising source lines arranged at substantially regular intervals in a first direction, gate lines arranged at substantially regular intervals in a second direction, pixels defined by the source lines and the gate lines, a first switching element and a second switching element connected to a first gate line, a first pixel comprising a first pixel electrode electrically connected to the first switching element via a first contact hole formed on one side of the first gate line in the second direction, and a second pixel adjacent to the first pixel in the first direction and comprising a second pixel electrode electrically connected to the second switching element via a second contact hole formed on other side of the first gate line in the second direction;

a counter-substrate comprising a first light-shielding portion opposed to the first gate line and the first contact hole and extending with a first width, and a second light-shielding portion formed integrally with the first light-shielding portion, opposed to the first gate line and the second contact hole and extending with a width substantially equal to the first width; and a spacer between the array substrate and the counter-substrate.

(8) In the display device of (7), the second pixel is adjacent to the first pixel in the first direction, and is adjacent to a third pixel comprising the same structure as the first switching element and the first light-shielding portion on the other side in the second direction.

(9) In the display device of (8), the counter-substrate comprises a third light-shielding portion opposed to the source lines, and aperture areas of the pixels are formed by the first to third light-shielding portions.

(10) In the display device of (9), an aperture area of the first pixel is less than an aperture area of the second pixel and greater than an aperture area of the third pixel.

(11) In the display device of any one of (7) to (9), the spacer is formed between adjacent two source lines and located in a fourth pixel adjacent to the second pixel on the one side in the second direction.

(12) In the display device of (11), the spacer is formed on the counter-substrate and further comprises a spacer light-shielding portion having a width greater than the first width and covering the periphery of the spacer, and the spacer light-shielding portion covers part of each of the fourth pixel in which the spacer is located, two pixels adjacent to the fourth pixel in the first direction, and the first pixel.

(13) In the display device of any one of (7) to (10), the spacer includes a first spacer disposed in the array substrate and a second spacer disposed in the counter-substrate and in contact with the first spacer, one end of the first spacer is formed in an area overlapping the second light-shielding layer, the other end of the first spacer is formed in an area overlapping the first light-shielding layer, one end of the second spacer is formed in an area overlapping the second light-shielding layer, the other end of the second spacer is formed in an area overlapping the first light-shielding layer, and the first spacer and the second spacer cross each other at an angle greater than 0° and less than 90°.

(14) In the display device of any one of (7) to (10), the spacer includes a first spacer disposed in the first pixel formed on the array substrate side, a second spacer disposed in the second pixel formed on the array substrate side, and a third spacer disposed on the counter-substrate side and in contact with the first spacer and the second spacer, the first spacer is formed in an area overlapping the second light-shielding layer, the second spacer is formed in an area overlapping the first light-shielding layer, one end of the third spacer is in contact with the first spacer in the area overlapping the second light-shielding layer, and the other end of the third spacer is formed in the area overlapping the first light-shielding layer and in contact with the second spacer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising
source lines arranged in a first direction,
gate lines arranged in a second direction,
a first switching element and a second switching element connected to a first gate line which is one of the gate lines,
a first pixel electrode which is electrically connected to the first switching element via a first contact hole formed on one side of the first gate line in the second direction and extends toward the one side in the second direction, and
a second pixel electrode which is electrically connected to the second switching element via a second contact hole formed on other side of the first gate line in the second direction and extends toward the one side in the second direction beyond the first gate line; and
a second substrate opposed to the first substrate, wherein
the second pixel electrode is adjacent to the first pixel electrode in the first direction,
the first gate line is located between the first contact hole and the second contact hole in a plan view, and the second pixel electrode overlaps the first gate line, and
the second pixel electrode is longer than the first pixel electrode in the second direction.

2. The display device of claim 1, further comprising:
a first source line electrically connected to the first switching element;
a second source line electrically connected to the second switching element;
a third contact hole connecting the first switching element to the first source line and formed on the one side in second direction; and
a fourth contact hole connecting the second switching element to the second source line and formed on the other side in second direction.

3. The display device of claim 2, wherein
the first switching element comprises a first semiconductor layer having a first shape and crossing the first gate line at two points, and
the second switching element comprises a second semiconductor layer having a second shape and crossing the first gate line at two points.
4. The display device of claim 1, further comprising:
a first light-shielding portion formed on the second substrate, opposed to the first gate line and the first contact hole and having a first width; and
a second light-shielding portion formed on the second substrate, opposed to the first gate line and the second contact hole and having a width substantially equal to the first width.
5. The display device of claim 2, further comprising:
a first light-shielding portion formed on the second substrate, opposed to the first gate line and the first contact hole and having a first width; and
a second light-shielding portion formed on the second substrate, opposed to the first gate line and the second contact hole and having a width substantially equal to the first width.
6. The display device of claim 3, further comprising:
a first light-shielding portion formed on the second substrate, opposed to the first gate line and the first contact hole and having a first width; and
a second light-shielding portion formed on the second substrate, opposed to the first gate line and the second contact hole and having a width substantially equal to the first width.
7. The display device of claim 4, further comprising:
a first spacer formed on the first substrate; and
a second spacer formed on the second substrate and in contact with the first spacer, wherein
one end of the first spacer is formed in an area overlapping the first light-shielding portion,
other end of the first spacer is formed in an area overlapping the second light-shielding portion,
one end of the second spacer is formed in an area overlapping the first light-shielding portion,
other end of the second spacer is formed in an area overlapping the second light-shielding portion, and
the first spacer and the second spacer cross each other at an angle greater than 0° and less than 90°.
8. The display device of claim 4, further comprising:
a first spacer and a second spacer formed on the first substrate; and
a third spacer formed on the second substrate and in contact with the first spacer and the second spacer, wherein
the first spacer is formed in an area overlapping the first light-shielding portion,
the second spacer is formed in an area overlapping the second light-shielding portion,
one end of the third spacer is in contact with the first spacer in the area overlapping the first light-shielding portion, and
other end of the third spacer is formed in the area overlapping the second light-shielding portion and in contact with the second spacer.
9. A display device comprising:
an array substrate comprising
source lines arranged at substantially regular intervals in a first direction,
gate lines arranged at substantially regular intervals in a second direction,
pixels defined by the source lines and the gate lines,
a first switching element and a second switching element connected to a first gate line which is one of the gate lines,
a first pixel comprising a first pixel electrode electrically connected to the first switching element via a first contact hole formed on one side of the first gate line in the second direction, and
a second pixel adjacent to the first pixel in the first direction and comprising a second pixel electrode electrically connected to the second switching element via a second contact hole formed on other side of the first gate line in the second direction;
a counter-substrate comprising
a first light-shielding portion opposed to the first gate line and the first contact hole and extending with a first width, and
a second light-shielding portion formed integrally with the first light-shielding portion, opposed to the first gate line and the second contact hole and extending with a width substantially equal to the first width; and
a spacer between the array substrate and the counter-substrate, wherein
the second pixel electrode is longer than the first pixel electrode in the second direction, and overlaps the first gate line, and
the first gate line is located between the first contact hole and the second contact hole in a plan view.
10. The display device of claim 9, wherein
the second pixel is adjacent to the first pixel in the first direction, and is adjacent to a third pixel comprising a same structure as the first switching element and the first light-shielding portion on the other side in the second direction.
11. The display device of claim 10, wherein
the counter-substrate comprises a third light-shielding portion opposed to the source lines, and
aperture areas of the pixels are formed by the first to third light-shielding portions.
12. The display device of claim 11, wherein
an aperture area of the first pixel is less than an aperture area of the second pixel and greater than an aperture area of the third pixel.
13. The display device of claim 9, wherein
the spacer is formed between adjacent two source lines and located in a fourth pixel adjacent to the second pixel on the one side in the second direction.
14. The display device of claim 10, wherein
the spacer is formed between adjacent two source lines and located in a fourth pixel adjacent to the second pixel on the one side in the second direction.
15. The display device of claim 11, wherein
the spacer is formed between adjacent two source lines and located in a fourth pixel adjacent to the second pixel on the one side in the second direction.
16. The display device of claim 13, wherein
the spacer is formed on the counter-substrate and further comprises a spacer light-shielding portion having a width greater than the first width and covering a periphery of the spacer, and
the spacer light-shielding portion covers part of each of the fourth pixel in which the spacer is located, two pixels adjacent to the fourth pixel in the first direction, and the first pixel.

17. The display device of claim 9, wherein the spacer includes a first spacer disposed in the array substrate and a second spacer disposed in the counter-substrate and in contact with the first spacer, one end of the first spacer is formed in an area overlapping the second light-shielding portion, other end of the first spacer is formed in an area overlapping the first light-shielding portion, one end of the second spacer is formed in an area overlapping the second light-shielding portion, other end of the second spacer is formed in an area overlapping the first light-shielding portion, and the first spacer and the second spacer cross each other at an angle greater than 0° and less than 90°.

18. The display device of claim 10, wherein the spacer includes a first spacer disposed in the array substrate and a second spacer disposed in the counter-substrate and in contact with the first spacer, one end of the first spacer is formed in an area overlapping the second light-shielding portion, other end of the first spacer is formed in an area overlapping the first light-shielding portion, one end of the second spacer is formed in an area overlapping the second light-shielding portion, other end of the second spacer is formed in an area overlapping the first light-shielding portion, and the first spacer and the second spacer cross each other at an angle greater than 0° and less than 90°.

19. The display device of claim 11, wherein the spacer includes a first spacer disposed in the array substrate and a second spacer disposed in the counter-substrate and in contact with the first spacer, one end of the first spacer is formed in an area overlapping the second light-shielding portion, other end of the first spacer is formed in an area overlapping the first light-shielding portion, one end of the second spacer is formed in an area overlapping the second light-shielding portion, other end of the second spacer is formed in an area overlapping the first light-shielding portion, and the first spacer and the second spacer cross each other at an angle greater than 0° and less than 90°.

20. The display device of claim 9, wherein the spacer includes a first spacer disposed in the first pixel formed on an array substrate side, a second spacer disposed in the second pixel formed on the array substrate side, and a third spacer formed on a counter-substrate side and in contact with the first spacer and the second spacer, the first spacer is formed in an area overlapping the second light-shielding portion, the second spacer is formed in an area overlapping the first light-shielding portion, one end of the third spacer is in contact with the first spacer in the area overlapping the second light-shielding portion, and other end of the third spacer is formed in the area overlapping the first light-shielding portion and in contact with the second spacer.

* * * * *